United States Patent
Luo et al.

(10) Patent No.: US 11,748,508 B2
(45) Date of Patent: Sep. 5, 2023

(54) DISPLAY METHOD AND APPARATUS, AND TERMINAL

(71) Applicant: Huawei Technologies Co., Ltd., Shenzhen (CN)

(72) Inventors: Honglei Luo, Shanghai (CN); Feng Gao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 229 days.

(21) Appl. No.: 16/758,903

(22) PCT Filed: Nov. 16, 2017

(86) PCT No.: PCT/CN2017/111437
§ 371 (c)(1),
(2) Date: Apr. 24, 2020

(87) PCT Pub. No.: WO2019/095235
PCT Pub. Date: May 23, 2019

(65) Prior Publication Data
US 2021/0165908 A1    Jun. 3, 2021

(51) Int. Cl.
G06F 21/62    (2013.01)
G06F 21/84    (2013.01)
G06V 40/19    (2022.01)
G06V 40/16    (2022.01)
G06F 1/16    (2006.01)

(52) U.S. Cl.
CPC .......... G06F 21/6245 (2013.01); G06F 21/84 (2013.01); G06V 40/161 (2022.01); G06V 40/19 (2022.01); G06F 1/1605 (2013.01)

(58) Field of Classification Search
CPC ...... G06F 21/6245; G06F 21/82; G06F 21/84; G06F 1/1605; G06V 40/16; G06V 40/161; G06V 40/19
See application file for complete search history.

(56) References Cited

U.S. PATENT DOCUMENTS

| | | | |
|---|---|---|---|
| 9,075,974 B2 | 7/2015 | Barr et al. | |
| 11,269,981 B2 | 3/2022 | Hu et al. | |
| 2010/0205667 A1 | 8/2010 | Anderson et al. | |
| 2011/0018998 A1* | 1/2011 | Guzik | H04N 21/21 348/143 |
| 2014/0029810 A1* | 1/2014 | Barr | G06F 21/32 382/118 |
| 2014/0139560 A1 | 5/2014 | Jung et al. | |
| 2014/0201844 A1* | 7/2014 | Buck | G06F 21/554 726/26 |
| 2015/0062354 A1 | 3/2015 | Zhang | |
| 2017/0092229 A1* | 3/2017 | Greenebaum | G09G 5/10 |

FOREIGN PATENT DOCUMENTS

| | | | | |
|---|---|---|---|---|
| CN | 101211484 A | 7/2008 | | |
| CN | 103108085 A | 5/2013 | | |
| CN | 103473511 A | 12/2013 | | |
| CN | 103685701 A | 3/2014 | | |
| CN | 103955650 A | 7/2014 | | |
| CN | 104063964 A | 9/2014 | | |
| CN | 104376247 A | 2/2015 | | |
| CN | 104834866 A | 8/2015 | | |
| CN | 104902071 A | 9/2015 | | |
| CN | 105550554 A | 5/2016 | | |
| CN | 106293751 A | 1/2017 | | |
| CN | 106296190 A | 1/2017 | | |
| CN | 106406530 A | 2/2017 | | |
| CN | 106557711 A | 4/2017 | | |
| CN | 107172347 A | 9/2017 | | |
| EP | 2515526 A2 * | 10/2012 | ......... | G06K 9/00221 |
| EP | 2927835 A1 | 10/2015 | | |
| JP | 2010128778 A | 6/2010 | | |
| WO | 2008117486 A1 | 10/2008 | | |
| WO | 2010101697 A2 | 9/2010 | | |
| WO | 2016041340 A1 | 3/2016 | | |

* cited by examiner

*Primary Examiner* — D'Arcy Winston Straub
(74) *Attorney, Agent, or Firm* — Slater Matsil, LLP

(57) ABSTRACT

This application provides a display method and apparatus, and a terminal, and relates to the field of image processing technologies, to resolve a problem that a peeping behavior of a peeper cannot be proved. The method is applied to a terminal having a front-facing camera and a display screen, where the front-facing camera and the display screen are on a same side of the terminal. The method includes: presenting a running interface of an application by using the display screen; collecting an image by using the front-facing camera; and when the image collected by the current camera meets a preset condition, presenting at least two display windows on the display screen. A first display window displays the running interface of the application, and a second display window displays the image collected by using the front-facing camera. This application is applicable to the terminal.

20 Claims, 34 Drawing Sheets

FIG. 21

DISPLAY METHOD AND APPARATUS, AND TERMINAL

CROSS-REFERENCE TO RELATED APPLICATIONS

This application is a National Stage of International Application No. PCT/CN2017/111437, filed on Nov. 16, 2017, which is hereby incorporated by reference in its entirety.

TECHNICAL FIELD

This application relates to the field of image processing technologies, and in particular, to a display method and apparatus, and a terminal.

BACKGROUND

With development of communications technologies, especially popularization of terminals such as smartphones, functions of the terminals are also increasing. For example, a user may implement functions such as data exchange, transfer, and electronic payment with another user by using a terminal. In a process in which the user actually uses the terminal, it is difficult to ensure that the user is in a comparatively covert state, regardless of whether the user is watching private information or a confidential document, or is performing an operation that requires comparatively high security, such as financial or account management. In other words, an operation currently implemented by the user on the terminal is likely to be peeped at by another user.

Currently, in a terminal production process, an optical reconstruction technology such as polarization and refraction may be used to process a screen, so that a user can clearly watch, only within a particular angle range in front of the screen, content displayed on the screen. When another user watches the screen from a position that is at an angle deriving from the front of the screen and that is beyond the particular angle range, the another user cannot clearly watch the content displayed on the screen. This protects user privacy. However, improvement on the screen increases costs in the terminal production process, and the use of the foregoing optical reconstruction technology causes a part of perspective light of the screen to be blocked to some extent. Consequently, a watching effect for the user is affected. In addition, for another user behind the user, the another user may still peep at the content currently displayed on the screen. To resolve the foregoing problem, a front-facing camera of the terminal may be further used to capture an image, and identify the captured image. Once the terminal detects that a peeper appears in a field of view of the front-facing camera, an interface currently displayed on the screen is switched to another interface, thereby protecting user privacy.

It can be learned that, the foregoing two implementation solutions can protect user privacy to some extent, but even if the user discovers the peeper and ensures security of partial privacy, the user cannot effectively prove a peeping behavior of the peeper by using the foregoing implementations.

SUMMARY

This application provides a display method and apparatus, and a terminal, to resolve a problem that a peeping behavior of a peeper cannot be proved.

According to a first aspect, an embodiment of the present invention provides a display method. The method is applied to a terminal having a front-facing camera and a display screen. The front-facing camera and the display screen are on a same side of the terminal. The method includes: presenting a running interface of an application by using the display screen; collecting an image by using the front-facing camera; and when the image collected by using the front-facing camera meets a preset condition, presenting at least two display windows on the display screen, where a first display window displays the running interface of the application, and a second display window displays the image collected by using the front-facing camera. Compared with a prior-art solution having a problem that a user cannot produce valid evidence against another user, this can simultaneously present a peeping behavior of the another user and content peeped at by the another user, thereby resolving a problem that the peeping behavior of the another user cannot be proved.

In a possible design, when the application matches a preset application, the front-facing camera is automatically turned on. Considering that when an image of a user other than a preset user is collected by the front-facing camera, if content currently watched by the preset user does not require high security, it may also be considered that a behavior of the another user is not substantial peeping. Therefore, subsequent split-screen displaying is triggered only after it is ensured that an application interface currently watched by the preset user is an interface of the preset application.

In a possible design, the preset condition includes the following: The image collected by using the front-facing camera includes an image of a user other than the preset user, and a distance between the another user and the preset user is less than a specified value. It should be noted that another user comparatively close to the preset user may be considered as basically the same as the preset user in terms of an angle, a distance, and the like of watching the display screen of the terminal. This means that a difference between definition of content presented on the display screen watched by the another user and definition of that watched by the preset user is comparatively small. In this case, it may be considered that the another user is very likely to clearly watch a running interface of an application currently watched by the preset user. Therefore, in this embodiment of the present invention, it is considered that the another user comparatively close to the preset user has a possibility of peeping.

In a possible design, the preset condition includes the following: The image collected by using the front-facing camera includes an image of a user other than the preset user, and a distance between the another user and the terminal is less than a specified value. It should be noted that another user comparatively close to the terminal may be considered as another user whose angle, distance, or the like of watching the display screen of the terminal can ensure that the another user can clearly watch a running interface of an application currently watched by the preset user. Therefore, in this embodiment of the present invention, it is considered that the another user comparatively close to the terminal has a possibility of peeping.

In a possible design, the preset condition includes the following: The image collected by using the front-facing camera includes two eyes of the preset user, and further includes at least a third eye. By default, when the preset user watches the display screen of the terminal, the image collected by using the front-facing camera of the terminal includes an area in which two eyeballs of the preset user are located. When an area in which a third eyeball is located appears in the collected image, it is considered that there is another user.

In a possible design, the preset condition includes the following: The image includes a face image other than a preset image. An image of the preset user, namely, the preset image, may be prestored in the terminal. A face image, other than the preset image, collected by using the front-facing camera may be considered as a face image of a user other than the preset user.

In a possible design, at least a partial area of the image collected by using the front-facing camera is enlarged. In this case, an enlarged image is displayed on the second display window. Split-screen displaying actually means that content not displayed at a same moment and content currently presented on the display screen are simultaneously displayed on the display screen. This means that such a display mode inevitably affects a display proportion of an original image and an interface. Therefore, when the image collected by using the front-facing camera and the application interface are simultaneously displayed, a display size and/or a display proportion of the image and the application interface need/needs to be adjusted. In addition, to more clearly present a peeping behavior of the another user to the preset user, the at least a partial area of the image collected by using the front-facing camera may be enlarged, and then only an enlarged partial area and the content in the application interface are presented to the user.

In a possible design, a focus window of the front-facing camera is located in an area in which the user other than the preset user is located. An adjusted focus window at least partially overlaps the area in which the another user is located. This means that the adjusted focus window may be completely located in the area in which the another user is located, or cover a part of the area in which the another user is located, or cover the entire area in which the another user is located. This is not limited herein. In this embodiment of the present invention, it suffices to ensure that after the focus window is adjusted, focus on the area in which the another user is located can be better implemented.

In a possible design, exposure weights of different areas in the image are adjusted based on a current position of the focus window. In this way, a weight of the area, at an edge, in which the another user is located is increased, to dynamically adjust exposure time and a gain, thereby ensuring that brightness of the area in which the another user is located is proper. This can avoid a problem caused by overexposure or underexposure of the area in which the another user is located in the image collected by using the front-facing camera. Overexposure causes excessively high brightness of the image, and underexposure causes excessively low brightness of the image.

In a possible design, the terminal may further automatically store content presented in at least two display windows. There may be a plurality of manners of obtaining the content presented in the at least two display windows, for example, operations such as screen capturing and screen recording. For example, a shortcut key similar to a floating window is set on the display screen, and the user may tap the shortcut key to trigger the operations such as screen capturing and screen recording. After successfully obtaining the content presented in the at least two display windows, the terminal may automatically store the obtained content in a preset local storage area for subsequent invoking, watching, or the like by the user.

In a possible design, the terminal may further send, to a target device, the content presented in at least two display windows, to implement an evidence producing function or a storage function. For example, the target device may be a device other than the terminal, or may be a third-party device such as a server configured to implement data storage on a network side. It can be learned that, in the foregoing implementation, the content obtained through evidence collection may be stored in the target device for subsequent evidence producing, or the related content may be directly submitted to a law enforcement department.

In a possible design, the terminal may automatically send, to the target device, the content presented in at least two display windows.

In a possible design, the terminal may further send prompt information, where the prompt information is used to prompt to pay attention to protecting personal information.

In a possible design, the terminal may further present a preset interface on the display screen. For security, after determining that there is a security risk for the user, the terminal may further present the preset interface on the display screen. The preset interface is a display interface that is set by the user or a display interface that is preset in the terminal, and includes but is not limited to a display interface or an operation interface that requires comparatively low security, such as a picture or a home screen of the terminal. Certainly, the preset interface may alternatively be an interface accessed by the user before the user accesses the current application interface, an interface that is currently running on the background and whose time for switching, by the user, an application corresponding to the interface to the background is comparatively short, or the like. A picture or an animation may also be superimposed on the application interface, where the picture or the animation may be moved, or may be deleted. This is not limited herein.

According to a second aspect, an embodiment of the present invention provides a display method. The method is applied to a terminal having a front-facing camera and a display screen. The front-facing camera and the display screen are on a same side of the terminal. The method includes: receiving a first operation that is input by a user; in response to the first operation, presenting a running interface of an application by using the display screen; when the application matches a preset application, automatically turning on the front-facing camera, and collecting an image by using the front-facing camera; when the image collected by using the front-facing camera meets a preset condition, presenting at least two display windows on the display screen, where a first display window displays the running interface of the application, and a second display window displays the image collected by using the front-facing camera; automatically storing content presented in the at least two display windows; sending, to a target device, the content presented in the at least two display windows; and sending prompt information, and/or presenting a preset interface on the display screen, where the prompt information is used to prompt to pay attention to protecting personal information. The sending, to a target device, the content presented in the at least two display windows includes: receiving a second operation that is input by the user; and in response to the second operation, sending, to the target device, the content presented in the at least two display windows; or automatically sending, to the target device, the content presented in the at least two display windows. Compared with a prior-art solution having a problem that a user cannot produce valid evidence against another user, this can simultaneously present a peeping behavior of the another user and content peeped at by the another user, thereby resolving a problem that the peeping behavior of the another user cannot be proved. In addition, in this embodiment of the present invention, the front-facing camera may be automatically turned on in a specific scenario; after the at least two display windows are presented, the content presented in the at least two display windows may be further automatically stored, and optionally, the content presented in the at least two display windows is actively or passively sent to the target device.

In a possible design, the preset condition includes at least the following: The image collected by using the front-facing camera includes an image of a user other than a preset user, and a distance between the another user and the preset user is less than a specified value; and/or the image collected by using the front-facing camera includes an image of a user other than a preset user, and a distance between the another user and the terminal is less than a specified value; and/or the image collected by using the front-facing camera includes two eyes of a preset user, and further includes at least a third eye; and/or a result of facial recognition performed on the image collected by using the front-facing camera indicates that the image includes a face image other than a preset image.

In a possible design, the method further includes: enlarging at least a partial area of the image collected by using the front-facing camera, where a focus window of the front-facing camera is located in an area in which the user other than the preset user is located; and displaying an enlarged image on the second display window.

In a possible design, the running interface includes a password input interface. It should be noted that the running interface of the application includes but is not limited to the password input interface, and may alternatively be another interface related to preset personal information of the user, and certainly may alternatively be an interface that requires comparatively high security. This is not limited herein.

According to a third aspect, an embodiment of the present invention provides a display apparatus. The apparatus is applied to a terminal having a front-facing camera and a display screen. The front-facing camera and the display screen are on a same side of the terminal. The apparatus can implement a function implemented in the foregoing method embodiment. The function may be implemented by hardware, or may be implemented by hardware by executing corresponding software. The hardware or software includes one or more modules corresponding to functions shown in the first aspect and the possible designs of the first aspect.

According to a fourth aspect, an embodiment of the present invention provides a display apparatus. The apparatus is applied to a terminal having a front-facing camera and a display screen. The front-facing camera and the display screen are on a same side of the terminal. The apparatus can implement a function implemented in the foregoing method embodiment. The function may be implemented by hardware, or may be implemented by hardware by executing corresponding software. The hardware or software includes one or more modules corresponding to functions shown in the second aspect and the possible designs of the second aspect.

According to a fifth aspect, an embodiment of the present invention provides a terminal. A structure of the terminal includes a display screen, a memory, one or more processors, a plurality of application programs, and one or more programs. The one or more programs are stored in the memory. When the one or more programs are executed by the one or more processors, the terminal is enabled to implement the method according to any one of the first aspect or the possible designs of the first aspect.

According to a sixth aspect, an embodiment of the present invention provides a terminal. A structure of the terminal includes a display screen, a memory, one or more processors, a plurality of application programs, and one or more programs. The one or more programs are stored in the memory. When the one or more programs are executed by the one or more processors, the terminal is enabled to implement the method according to any one of the first aspect or the possible designs of the first aspect.

According to a seventh aspect, an embodiment of the present invention provides a readable storage medium, including an instruction. When the instruction is run on a terminal, the terminal is enabled to perform the method according to any one of the first aspect or the possible designs of the first aspect.

According to an eighth aspect, an embodiment of the present invention provides a readable storage medium, including an instruction. When the instruction is run on a terminal, the terminal is enabled to perform the method according to any one of the second aspect or the possible designs of the second aspect.

According to a ninth aspect, an embodiment of the present invention provides a computer program product. The computer program product includes software code, and the software code is used to perform the method according to any one of the first aspect or the possible designs of the first aspect.

According to a tenth aspect, an embodiment of the present invention provides a computer program product. The computer program product includes software code, and the software code is used to perform the method according to any one of the first aspect or the possible designs of the first aspect.

According to an eleventh aspect, an embodiment of the present invention provides a graphical or user interface, configured to perform the method according to any one of the first aspect or the possible designs of the first aspect.

According to a twelfth aspect, an embodiment of the present invention provides a graphical or user interface, configured to perform the method according to any one of the second aspect or the possible designs of the second aspect.

BRIEF DESCRIPTION OF THE DRAWINGS

FIG. 21 is a schematic diagram of an exposure weight before and after adjustment according to an embodiment of the present invention;

DESCRIPTION OF REFERENCE SIGNS

Figure 1:
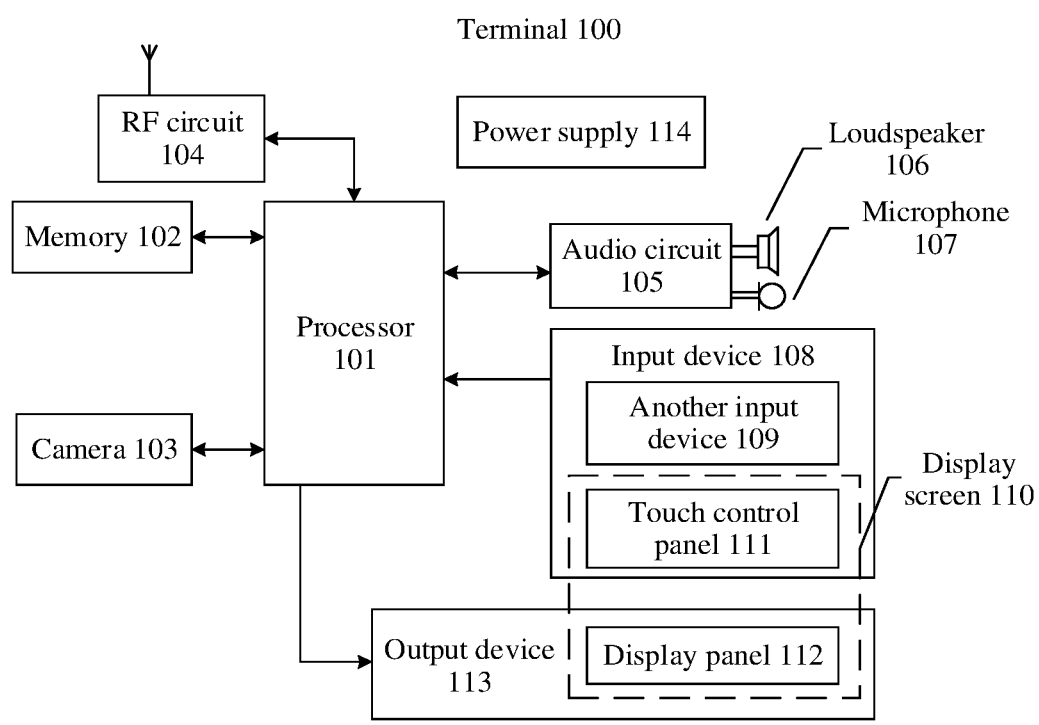
FIG. 1 is a first type of schematic structural diagram of a terminal according to an embodiment of the present invention.

1: front-facing camera
2: display screen
3: function key
4: digital keyboard
5: payment dialog box
6: image collected by using a front-facing camera
7: area in which another user is located in an image collected by using a front-facing camera
8: focus window
9: shortcut key.

DETAILED DESCRIPTION OF ILLUSTRATIVE EMBODIMENTS

The following describes the technical solutions in the embodiments of the present invention with reference to the accompanying drawings in the embodiments of the present invention.

The embodiments of the present invention may be used for a terminal, and the terminal may be a device such as a tablet computer or a smartphone. The terminal has at least a camera, a display screen, an input device, and a processor. A terminal 100 is used as an example. As shown in FIG. 1, the terminal 100 includes components such as a processor 101, a memory 102, a camera 103, an RF circuit 104, an audio circuit 105, a loudspeaker 106, a microphone 107, an input device 108, another input device 109, a display screen 110, a touch control panel 11, a display panel 112, an output device 113, and a power supply 114. The display screen 110 includes at least the touch control panel 111 serving as an input device and the display panel 112 serving as an output device. The camera 103 may include a front-facing camera and a rear-facing camera. In the embodiments of the present invention, the camera 103 includes at least the front-facing camera. It should be noted that a terminal structure shown in FIG. 1 constitutes no limitation on the terminal, and the terminal may include more or fewer components than those shown in the figure, or combine some components, or split some components, or have a different component arrangement. This is not limited herein.

The following describes each composition part of the terminal 100 in detail with reference to FIG. 1.

The radio frequency (Radio Frequency, RF) circuit 104 may be configured to: send and/or receive information or receive and send a signal during a call. For example, if the terminal 100 is a mobile phone, the terminal 100 may send, by using the RF circuit 104 after receiving downlink information sent by a base station, the downlink information to the processor 101 for processing, and send related uplink data to the base station. The RF circuit usually includes but is not limited to an antenna, at least one amplifier, a transceiver, a coupler, a low noise amplifier (Low Noise Amplifier, LNA), a duplexer, and the like. In addition, the RF circuit 104 may further communicate with a network and another device through wireless communication. The wireless communication may use any communications standard or protocol, including but not limited to the global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short messaging service (Short Messaging Service, SMS), and the like.

The memory 102 may be configured to store a software program and a module. The processor 101 runs the software program and the module that are stored in the memory 101, to perform various functions and applications of the terminal 100 and process data. The memory 101 may mainly include a program storage area and a data storage area. The program storage area may store an operating system, an application program required by at least one function (such as a sound playing function or an image playing function), and the like. The data storage area may store data (such as audio data or video data) created based on use of the terminal 100, and the like. In addition, the memory 101 may include a high-speed random access memory, and may further include a non-volatile memory, such as at least one magnetic disk storage device, a flash storage device, or another volatile solid-state storage device.

The another input device 109 may be configured to: receive input digit or character information, and generate key signal input related to user setting and function control of the terminal 100. Specifically, the another input device 109 may include but is not limited to one or more of physical keyboards, a function key (such as a volume control key or an on/off key), a tracking ball, a mouse, a joystick, an optical mouse (the optical mouse is a touch-sensitive surface that does not display visual output, or an extension of a touch-sensitive surface formed by a touchscreen), or the like. The another input device 109 may further include a sensor built in the terminal 100, such as a gravity sensor or an acceleration sensor, and the terminal 100 may further use, as input data, a parameter detected by the sensor.

The display no may be configured to display information input by a user or information provided for the user, and various menus of the terminal 100, and may further receive user input. In addition, the display panel 112 may be configured in a form of a liquid crystal display (Liquid Crystal Display, LCD), an organic light-emitting diode (Organic Light-Emitting Diode, OLED), or the like. The touch control panel 111, also referred to as a touchscreen, a touch-sensitive screen, or the like, may collect a touch or non-touch operation (for example, an operation performed by the user on the touch control panel 111 or near the touch control panel 111 by using any proper object or accessory, such as a finger or a stylus, or a motion sensing operation may be included, and the operation includes an operation type such as a single-point control operation or a multipoint control operation) performed by the user on or near the touch control panel, and drive a corresponding connection apparatus based on a preset program. It should be noted that the touch control panel 111 may further include two parts: a touch detection apparatus and a touch controller. The touch detection apparatus detects a touch orientation and gesture of the user, detects a signal brought by a touch operation, and sends the signal to the touch controller. The touch controller receives touch information from the touch detection apparatus, converts the touch information into information that can be processed by the processor 101, and then transmits the information to the processor 101. In addition, the touch controller can further receive and execute a command sent by the processor 101. In addition, the touch control panel 111 may be implemented in a plurality of types, such as a resistive type, a capacitive type, an infrared ray, and a surface acoustic wave, or the touch control panel 111 may be implemented by using any technology developed in the future. Generally, the touch control panel 111 may cover the display panel 112. The user may perform, based on content displayed on the display panel 112 (the displayed content includes but is not limited to a soft keyboard, a virtual mouse, a virtual key, an icon, and the like), an operation on or near the touch control panel 111 that covers the display panel 112. After detecting the operation on or near the touch control panel 111, the touch control panel in transmits the operation to the processor 101 to determine user input, and then the processor 101 provides corresponding visual output on the display panel 112 based on the user input. In FIG. 1, the touch control panel 111 and the display panel 112 serve as two independent components to implement input and output functions of the terminal 100. However, in some embodiments, the touch control panel 111 and the display panel 112 may be integrated to implement the input and output functions of the terminal 100.

The RF circuit 104, the loudspeaker 106, and the microphone 107 may provide an audio interface between the user and the terminal 100. The audio circuit 105 may convert received audio data into a signal, and transmit the signal to the loudspeaker 106, and the loudspeaker 106 converts the signal into a voice signal for output. In addition, the microphone 107 may convert a collected voice signal into a signal, and the audio circuit 105 receives the signal, converts the signal into audio data, and then outputs the audio data to the RF circuit 104, to send the audio data to a device such as another terminal, or output the audio data to the memory 102, so that the processor 101 performs further processing with reference to content stored in the memory 102. In addition, the camera 103 may collect an image frame in real time and send the image frame to the processor 101 for processing, and store a processed result in the memory 102 and/or display a processed result to the user by using the display panel 112.

The processor 101 is a control center of the terminal 100, is connected to each part of the entire terminal 100 by using various interfaces and lines, and performs various functions of the terminal 100 and data processing by running or executing the software program and/or the module that are/is stored in the memory 102 and invoking data stored in the memory 102, to perform overall monitoring on the terminal 100. It should be noted that the processor 101 may include one or more processing units. An application processor and a modem processor may be integrated into the processor 101. The application processor mainly processes an operating system, a user interface (User Interface, UI), an application program, and the like. The modem processor mainly processes wireless communication. It may be understood that, alternatively, the modem processor may not be integrated into the processor 101.

The terminal 100 may further include the power supply 114 (for example, a battery) that supplies power to each component. In this embodiment of the present invention, the power supply 114 may be logically connected to the processor 101 by using a power management system, to manage functions such as charging, discharging, and power consumption by using the power management system.

In addition, a component not shown in FIG. 1 also exists. For example, the terminal 100 may further include a Bluetooth module, and the like. Details are not described herein.

Figure 2:
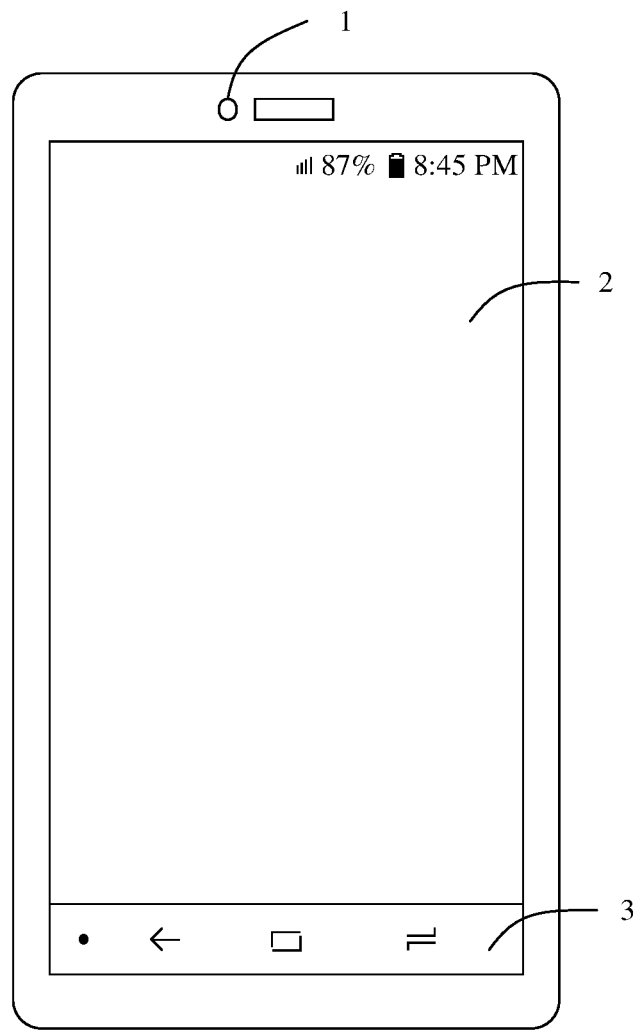
FIG. 2 is a schematic diagram of a display screen of a terminal according to an embodiment of the present invention.
Figure 3:
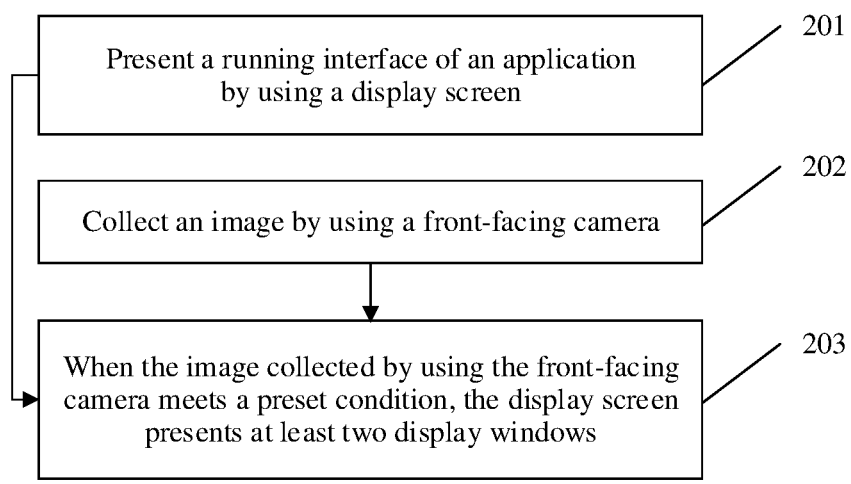
FIG. 3 is a first type of flowchart of a display method according to an embodiment of the present invention.

An embodiment of the present invention provides a display method. The method is applicable to the terminal 100 shown in FIG. 1. As shown in FIG. 2, the terminal is a terminal having a front-facing camera 1 and a display screen 2, where the front-facing camera and the display screen are on a same side of the terminal. It should be noted that, the terminal may further present a function key shown in FIG. 2 to the user on the display screen, where the function key may include a key used to trigger jumping to a previous display interface, a key used to trigger returning to a home screen of the terminal, and the like. This is not limited herein. As shown in FIG. 3, the method includes step 201 to step 203.

Step 201: Present a running interface of an application by using the display screen.

For a user, only producing evidence by using an image reflecting a peeping behavior of another user is insufficient because if content watched by the another user is content such as an advertisement or a soap opera, a behavior of the another user cannot be regarded as the peeping behavior because the behavior of the another user cannot infringe upon user privacy. Therefore, in this embodiment of the present invention, content presented on the current display screen to the user, in other words, a running interface of an application presented on the current display screen needs to be obtained. It can be considered that the another user has the peeping behavior only when the content presented on the running interface of the application requires comparatively high security or privacy. For example, when content currently watched by the another user relates to user privacy, or relates to information such as an account, a password, and a chat interface of the user, it can be considered that the another user has the peeping behavior.

Figure 4:
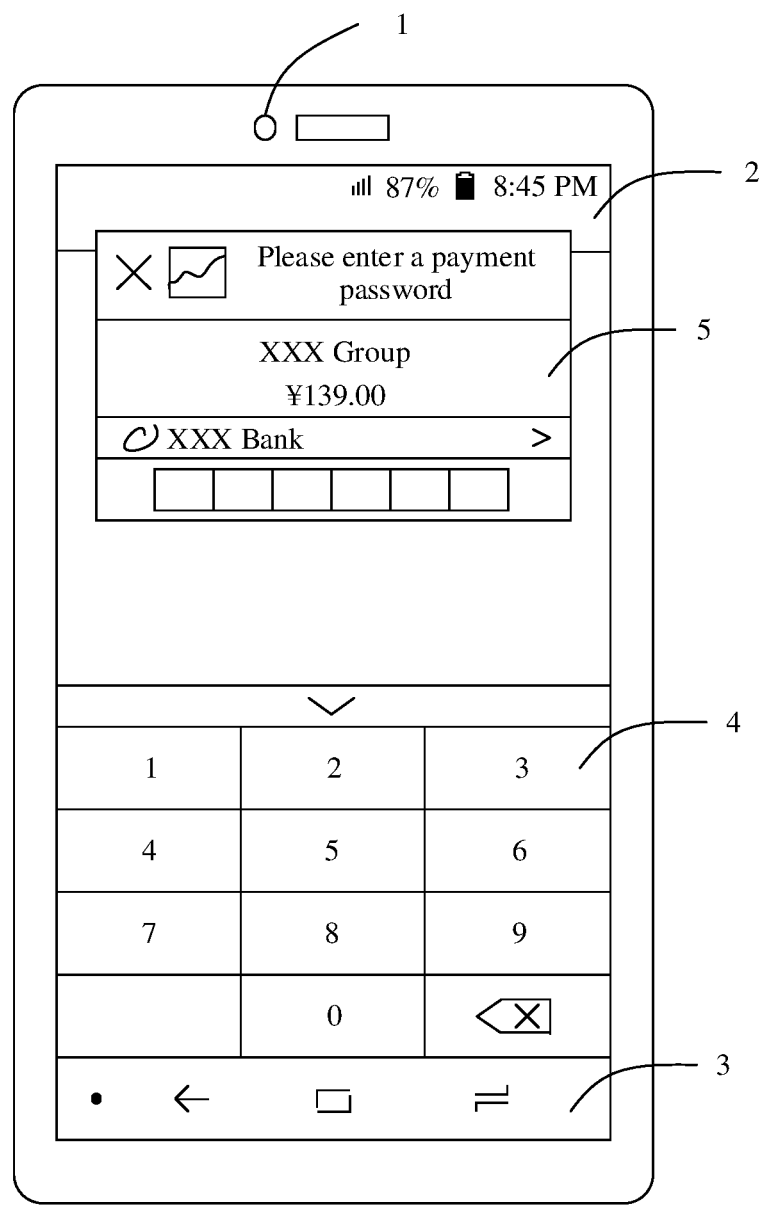
FIG. 4 is a schematic diagram of presenting an application interface by using a display screen according to an embodiment of the present invention.

A payment interface is used as an example. As shown in FIG. 4, an application interface presented by a terminal on a display screen is a payment interface provided by an application having a payment function. The application interface presented on the display screen includes a payment dialog box, a digital keyboard, and basic information related to the terminal such as a network status, a power consumption status, and time. The payment dialog box usually includes information used to prompt the user to complete a payment operation and information such as a payment receiver, a payment amount, a payment approach, and a password input area. For example, a current payment dialog box presents "XXX Group" to attempt to enable a user to complete payment of CYN 139. The user is prompted, by using a text above the payment dialog box, to input a payment password. The user may tap an arrow displayed at an end of a row in which "XXX Bank" is located to select a payment approach. In this case, a payment approach selected by the user is to use a bank card for payment, and a selected bank card is a bank card of "XXX Bank". Six successive rectangles below the payment dialog box are used by the user to input the payment password by using a digital keyboard, to complete a payment operation in a condition that the payment password is correct.

Step 202: Collect an image by using a front-facing camera.

Figure 5:
FIG. 5 shows an image collected by using a front-facing camera according to an embodiment of the present invention.

Considering that if the another user attempts to peep at information, of the user, that requires comparatively high security such as payment information and an account password, the another user needs to face the display screen of the terminal, to peep at content currently displayed on the terminal. Therefore, if the user needs to obtain evidence, a video or an image generated in a position in which the content displayed on the display screen can be currently peeped at needs to be obtained. However, the front-facing camera of the terminal is generally disposed on a side in which the display screen is located. Therefore, if the foregoing video or image is obtained, a built-in front-facing camera of the peeped-at terminal may be used to collect the video or the image. For example, FIG. 5 shows an image collected by the terminal by using the front-facing camera.

It should be noted that collecting the image by using the front-facing camera may be collecting one frame of image at a current moment by using the front-facing camera, or collecting a plurality of consecutive frames of images generated within a period of time, or collecting several frames of image extracted, randomly or according to a specific step, from a plurality of consecutive frames of images generated within a period of time. This is not limited herein. It can be learned that the content collected in step 202 may be one frame of image, a plurality of frames of images, a video consisting of a plurality of frames of images, or the like.

In addition, because the terminal currently presents the running interface of the application by using the display screen, the image collected by using the front-facing camera may be stored in a location such as a local or a cloud of the terminal for temporary storage or permanent storage by the user. When the terminal needs to simultaneously present the application interface and the image collected by using the front-facing camera, the image is obtained from the storage area. Certainly, the operation of collecting the image and the operation of simultaneous presentation may also be performed in real time. In other words, in a process in which the user uses the terminal, if the user currently expects to collect the image by using the front-facing camera, and simultaneously presents, on the display screen of the terminal, the collected image and an application interface on which an operation is performed, the user may manually trigger the terminal to collect the image by using the front-facing camera, and present the collected image and the application interface to the user. In this way, the collected image may be directly displayed without an intermediate buffer or storage operation.

It should be noted that when the application presented in step 201 matches a preset application, the terminal may automatically turn on the front-facing camera to collect the image. That the application matches the preset application includes but is not limited to that the application is one of the preset applications, or that the currently presented application interface is a display interface or an operation interface of the preset application. The preset application may be preset by the user, or may be automatically set by the terminal with reference to a security level that is noted when the terminal downloads the preset application from a platform such as an application store. Details are not described herein.

The preset application may be an application that requires comparatively high security or privacy, for example, a third-party application related to an online bank payment function or an application of each bank. A specified display interface may be a display interface, preset by a preset user, of a specific application or some applications that require/ requires comparatively high security, or a display interface that requires comparatively high security in a process of accessing or using a specific application or some applications, for example, an application interface that displays content such as an encrypted file or an address book in a reading application. This is not limited herein. A specified operation interface is similar to the specified display interface. In other words, the specified operation interface is an operation interface, preset by the preset user, of a specific application or some applications that require/requires comparatively high security, or an operation interface that requires comparatively high security in a process of accessing and using a specific application or some applications, for example, a login interface of each type of application and an account setting interface of each type of application. This is not limited herein.

Step 203: When the image collected by using the front-facing camera meets a preset condition, the display screen presents at least two display windows.

A first display window displays the running interface of the application, and a second display window displays the image collected by using the front-facing camera.

Content displayed in the first display window includes all or some content displayed on the running interface of the application. In addition, in this embodiment of the present invention, the running interface of the application may be an interface obtained by scaling down according to a specific proportion by using the running interface of the application as a reference, or certainly may be an interface obtained by scaling down according to a specific proportion after some content displayed on the running interface of the application is extracted, or the like. This is not limited herein.

For the terminal, when the image collected by using the front-facing camera meets the preset condition, the display screen may present at least two display windows. That the image meets the preset condition includes but is not limited to that the image includes the user other than the preset user. For a manner of identifying the another user, an identification manner provided in the prior art may be used. The following may also describe in detail the manner of identifying the another user. Details are not described herein.

It should be noted that, before simultaneous presentation is implemented, the application interface may be obtained in advance. A specific operation may be an operation manner, such as screen capturing or screen recording, used to capture a complete application interface or to capture an area that displays important information in a complete application interface. Screen capturing is used to obtain an application interface presented by the terminal to the user at a current moment, for example, the payment interface shown in FIG. 4. Screen recording is used to obtain an interface presented by the terminal to the user in a time period. The area that displays the important information may be considered as an area, in the application interface, reflecting that content presented on the interface requires comparatively high security, for example, the payment dialog box shown in FIG. 4.

In this embodiment of the present invention, the manner of simultaneously presenting the application interface and the image collected by using the front-facing camera on the display screen may be split-interface displaying. A specific implementation may use split-screen displaying. The split-screen displaying means that the display window of the display screen is divided into at least two display windows, the first display window displays the running interface of the application, and the second display window displays the image collected by using the front-facing camera.

In this embodiment of the present invention, the split-screen displaying refers to dividing the display interface presented by the terminal to the user into at least two parts. That the display interface is divided into two parts is used as an example. If FIG. 5 shows an image collected by using a front-facing camera, a specific division manner may be an up-and-down split-screen mode used when a terminal shown in FIG. 6(*a*) and FIG. 6(*b*) is in portrait mode for watching, and may further be a left-and-right split-screen mode used when a terminal shown in FIG. 7 is in landscape mode for watching.

It should be noted that, proportions of a first part and a second part of the foregoing two parts that respectively occupy an entire display screen may be the same, in other words, the display screen is equally divided, or may be equally divided. This is not limited herein. When the foregoing two parts are divided, the two parts may be divided into two rectangles (including squares), or may be divided into two irregular areas. For example, a wavy line, a fold line, a slash line, or the like is used as a boundary, and the display screen is divided into two parts, and therefore an interface presented to the user is more beautiful. Alternatively, the two parts are represented in a manner of stacking interfaces (this presentation manner may also be considered as a split-screen mode). For example, as shown in FIG. 8, a running interface of an application is stacked over an image collected by using a front-facing camera. It should be noted that FIG. 8 is merely a possible example. In an actual displaying process, the image collected by using the front-facing camera may be stacked over the running interface of the application. This is not limited herein. In addition, after the screen splitting, sizes of the two interfaces may be adjusted in a manner of manual dragging, sliding, or the like. In a case shown in FIG. 7(*a*) and FIG. 6(*b*), a location of the interface at an upper layer may also be adjusted in a manner of manual dragging, sliding, or the like. In addition, for a display mode shown in FIG. 8, to ensure that an interface at a bottom layer can clearly present content displayed on the interface as much as possible, an interface at the upper layer may be displayed at specific transparency. In this way, the interface at the bottom layer may also implicitly present content, and may be not completely covered by the interface at the upper layer. In this embodiment of the present invention, presentation manners shown in FIG. 6(*a*) and FIG. 6(*b*) to FIG. 8 each is possible presentation displaying. A specific division manner is not limited herein.

After the display screen is successfully divided into two parts, specific parts in which the image and the running interface of the application are respectively located are not limited in this embodiment of the present invention. For example, in portrait mode for watching shown in FIG. 6(*a*), a collected image is located at an upper part of the display screen, and a running interface of the application is located at a lower part of the display screen. In another case, in portrait mode for watching shown in FIG. 6(*b*), a collected image is located at a lower part of the display screen, and an application interface is located at an upper part of the display screen. In landscape mode for watching shown in FIG. 7(*a*), a collected image is located at a right part of the display screen, and a running interface of the application is located at a left part of the display screen. In another case, in landscape mode for watching shown in FIG. 7(*b*), a collected image is located at a left part of the display screen, and a running interface of the application is located at a right part of the display screen.

It should be noted that step 201 and step 202 may be simultaneously performed, or may be performed in a particular order. This is not limited herein.

Compared with a prior-art solution having a problem that a user cannot produce valid evidence against the another user, in this embodiment of the present invention, the terminal may collect the image by using the front-facing camera, and present the running interface of the application by using the display screen, and after the image collected by using the front-facing camera meets the preset condition, the display screen presents the running interface of the application and the image collected by using the front-facing camera. In this way, the peeping behavior of the another user and the content peeped at by the another user may be simultaneously presented, to resolve the problem that the peeping behavior of the another user cannot be proved.

Considering that power, resources, and the like of the terminal may be consumed during real-time monitoring, in an implementation of this embodiment of the present invention, subsequent split-screen displaying may be triggered only after the front-facing camera identifies that there is the user other than the preset user in the collected image. In other words, a monitoring procedure is triggered only when the content currently watched by the user has a risk of leakage.

It should be noted that, in this embodiment of the present invention, there are a plurality of manners of identifying whether there is an area in which the user other than the preset user is located in the collected image. Reference may be made to the following possible implementations. However, in this embodiment of the present invention, an implementation of identifying the another user is not limited.

For example, the preset user may preset access permission in the terminal. Specifically, an image may be prestored by collecting a face image, an iris image, or the like of the preset user. After the front-facing camera collects a face image, an iris image, or the like other than that of the prestored image by using technologies such as facial recognition and iris recognition, it is considered that there is a user that may be a peeper other than the preset user current watching the display screen.

The prestored image may be reflected as at least one image database, and each image database stores a prestored image of one preset user. This means that each terminal may be provided with at least one preset user, and different security levels may also be provided for different preset users. For example, for a user A, it is considered that triggering screen splitting is necessary only when a running interface of an application is a payment interface; and for a user B, it is considered that triggering screen splitting is necessary only when a running interface of an application is a payment interface or an account login interface. This is not limited in this embodiment of the present invention.

For another example, the terminal may determine, based on appearance time of a person in the image collected by using the front-facing camera, whether there is the another user. For content that requires comparatively high security, an identity of the user usually needs to be verified before accessing. Therefore, in this embodiment of the present invention, it is considered that the user first appears in the image collected by using the front-facing camera. This means that a user that appears after the first user inputs a collection range of the front-facing camera is considered as the another user that may be a peeper.

If there is the another user, whether a distance between the another user and the preset user is less than a specified value may be determined. It should be noted that another user comparatively close to the preset user may be considered as basically the same as the preset user in terms of an angle, a distance, and the like of watching the display screen of the terminal. This means that a difference between definition of content presented on the display screen watched by the another user and definition of that watched by the preset user is comparatively small. In this case, it may be considered that the another user is very likely to clearly watch a running interface of an application currently watched by the preset user. Therefore, in this embodiment of the present invention, it is considered that the another user comparatively close to the preset user has a possibility of peeping.

In this embodiment of the present invention, a manner of detecting the distance between the another user and the preset user includes but is not limited to the following detection manners.

By increasing or decreasing display brightness of the display screen, the terminal identifies a brightness change between a face of the preset user and a face of the another user, and analyzes and determines the distance between the another user and the preset user.

The terminal prestores or obtains an imaging proportion presented by using different position relationships between two users. The imaging proportion herein may be an imaging proportion between the face of the preset user and the face of the another user, an imaging proportion presented by using a position relationship between a facial feature of the preset user and a facial feature of the another user, or the like. This is not limited herein. The facial feature includes but is not limited to features of five senses of a person.

In this embodiment of the present invention, if there is the another user, whether the distance between the another user and the terminal is less than a specified value may also be determined. It should be noted that another user comparatively close to the terminal may be considered as another user whose angle, distance, or the like of watching the display screen of the terminal can ensure that the another user can clearly watch a running interface of an application currently watched by the preset user. Therefore, in this embodiment of the present invention, it is considered that the another user comparatively close to the terminal has a possibility of peeping.

In this embodiment of the present invention, a manner of detecting the distance between the another user and the terminal includes but is not limited to the following detection manners.

By increasing or decreasing display brightness of the display screen, the terminal identifies a brightness change on a face of the another user, and analyzes and determines the distance between the another user and the terminal. A distance range actually corresponding to various brightness changes may be prestored in the terminal.

The terminal prestores or obtains an imaging proportion presented by different position relationships between the user and the terminal. The imaging proportion herein may be an imaging proportion of the face of the another user, a position relationship between a facial feature of the another user and the terminal, or the like. This is not limited herein. The facial feature includes but is not limited to features of five senses of a person.

The specified value in the foregoing two implementations may be preset by the user based on an empirical value, or may be preset before the terminal is delivered from a factory. A setting manner, a setting occasion, or the like is not limited herein.

For another example, by default, when the preset user watches the display screen of the terminal, the image collected by using the front-facing camera of the terminal includes an area in which two eyeballs of the preset user are located. When an area in which a third eyeball is located appears in the collected image, it is considered that there is another user. In other words, when the image collected by the current position camera includes two eyes of the preset user, and further includes at least a third eye, a first image is presented on the display screen.

Considering that when an image of a user other than a preset user is collected by the front-facing camera, if content currently watched by the preset user does not require high security, it may also be considered that a behavior of the another user is not substantial peeping. Therefore, in an implementation of this embodiment of the present invention, it not only needs to be ensured that there is the user other than the preset user in the image, it but also needs to be ensured that subsequent split-screen displaying is triggered only when the running interface of the application currently watched by the preset user is the interface of the preset application.

It can be learned that in this embodiment of the present invention, if subsequent split-screen displaying needs to be triggered, image content collected by using the front-facing camera may be further monitored in real time, periodically, or non-periodically, or an application interface watched or operated by the preset user may be monitored on a basis of monitoring the image content, to determine whether there is the another user and the peeping behavior. The split-screen displaying is triggered if there is the another user and the peeper behavior, and processing such as automatic focus (Auto Focus, AF), automatic exposure (Auto Exposure, AE), and automatic white balance (Automatic White Balance, AWB) is performed.

Figure 9:
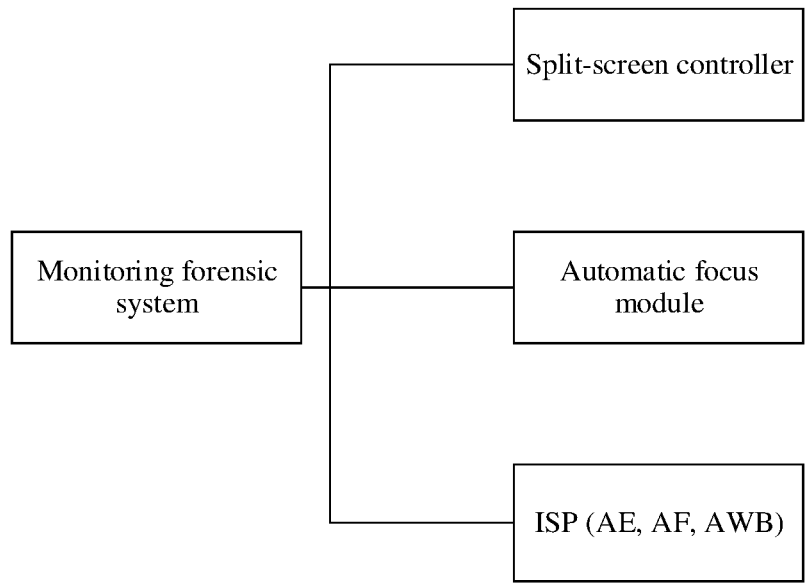
FIG. 9 a schematic diagram of a system structure inside a terminal according to an embodiment of the present invention.
Figure 10:
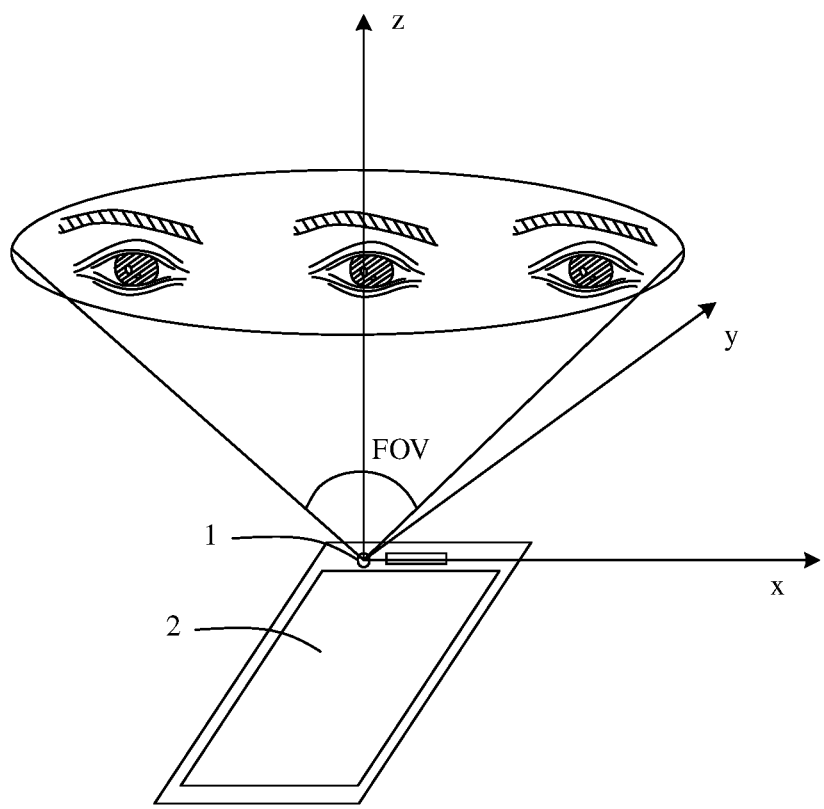
FIG. 10 is a schematic diagram of monitoring by using a wide-angle camera according to an embodiment of the present invention.
Figure 11:
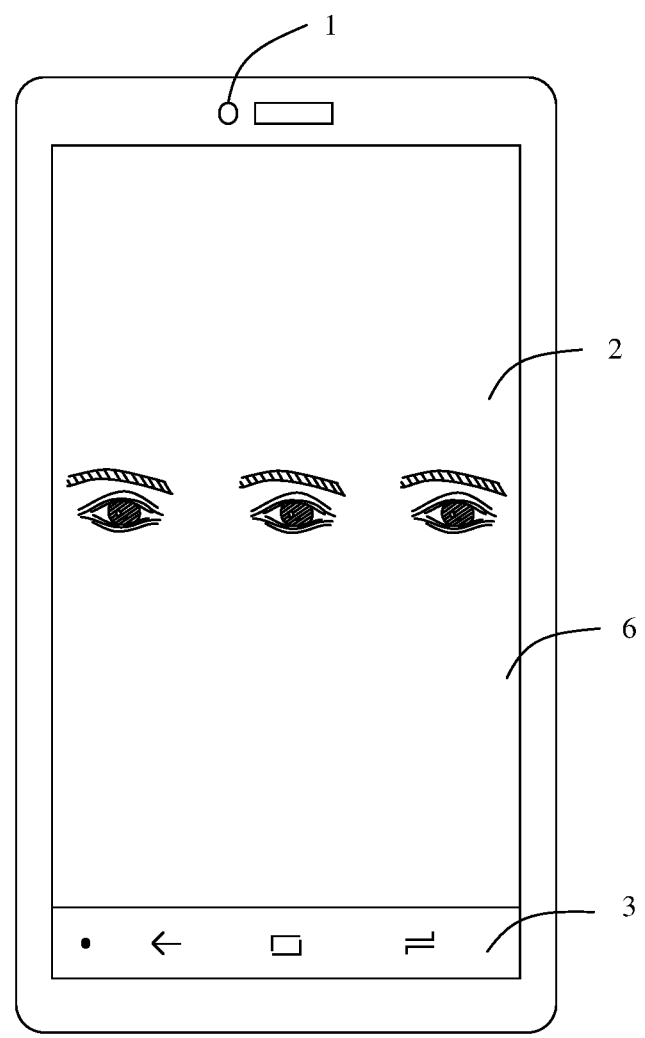
FIG. 11 is a schematic diagram of displaying an image collected by using a front-facing camera shown in FIG. 10 on a display screen of a terminal according to an embodiment of the present invention.

FIG. 9 shows a possible system architecture of monitoring and producing evidence inside a terminal, namely, a monitoring forensic system. The monitoring forensic system includes a split-screen controller, an automatic focus module, and an image information processing (Image Signal Processing, ISP) system. A function of the ISP system is to perform processing such as AF, AE, and AWB on the image. The monitoring forensic system detects, by using the automatic focus module, whether there is another user and a peeping behavior currently, and if there is the another user and/or the peeping behavior, triggers the split-screen controller to implement split-screen displaying of the terminal. Then, the ISP system processes an image to be displayed in a split-screen mode The automatic focus module may be a wide-angle module that can perform automatic focus. FIG. 10 is a schematic diagram of monitoring by using a wide-angle camera. The foregoing wide-angle camera may be a front-facing camera of the terminal. In this embodiment of the present invention, a direction perpendicular to the front-facing camera may be defined as a normal direction z (in other words, a positive direction of a z axis in a rectangular coordinate system), and a visible area in two sides of the Z axis is defined as a field of view (Field Of View, FOV). A larger FOV indicates a wider monitoring range. Therefore, an angle of the FOV of the front-facing camera is generally set to approach 180 degrees, to expand a monitoring range of the front-facing camera, thereby achieving a better monitoring effect. FIG. 11 is a schematic diagram of displaying, on a display screen of a terminal, an image collected by using a front-facing camera shown in FIG. 10. To be specific, after being preprocessed, all content, in the angle range of the FOV, that can be collected by the terminal by using the front-facing camera is presented to a user on the display screen. It should be noted that, because resolution of the image collected by using the front-facing camera is generally greater than resolution of the content that can be presented on the display screen, the foregoing preprocessing includes at least scaling down the collected image to obtain an interface that satisfies the resolution of the display screen, and then displaying the interface on the display screen. For a specific imaging processing process, refer to the prior art. This is not limited herein.

Split-screen displaying actually means that content not displayed at a same moment and content currently presented on the display screen are simultaneously displayed on the display screen. This means that such a display mode inevitably affects a display proportion of an original image and an interface. Therefore, in an implementation of this embodiment of this application, when the image collected by using the front-facing camera and the application interface are simultaneously displayed, a display size and/or the display proportion of the image and the application interface need/needs to be adjusted.

A specific adjustment manner may be:

enlarging at least a partial area of the image collected by using the front-facing camera.

An enlarged image is used as an image collected by using the front-facing camera, and is presented together with a running interface of an application by using the display screen. In this case, an enlarged image is displayed in the second display window.

It should be noted that the at least a partial area may be an area in which a user other than a preset user is located, or certainly may be an area, in an area in which the another user is located, that can reflect personal features of the another user, for example, an area of five senses. This is not limited herein.

Therefore, in step 203, that the display screen presents at least two display windows may be implemented as step 301 to step 303.

Step 301: Scale down a running interface of an application according to a first proportion, to obtain a target interface.

Figure 6A:
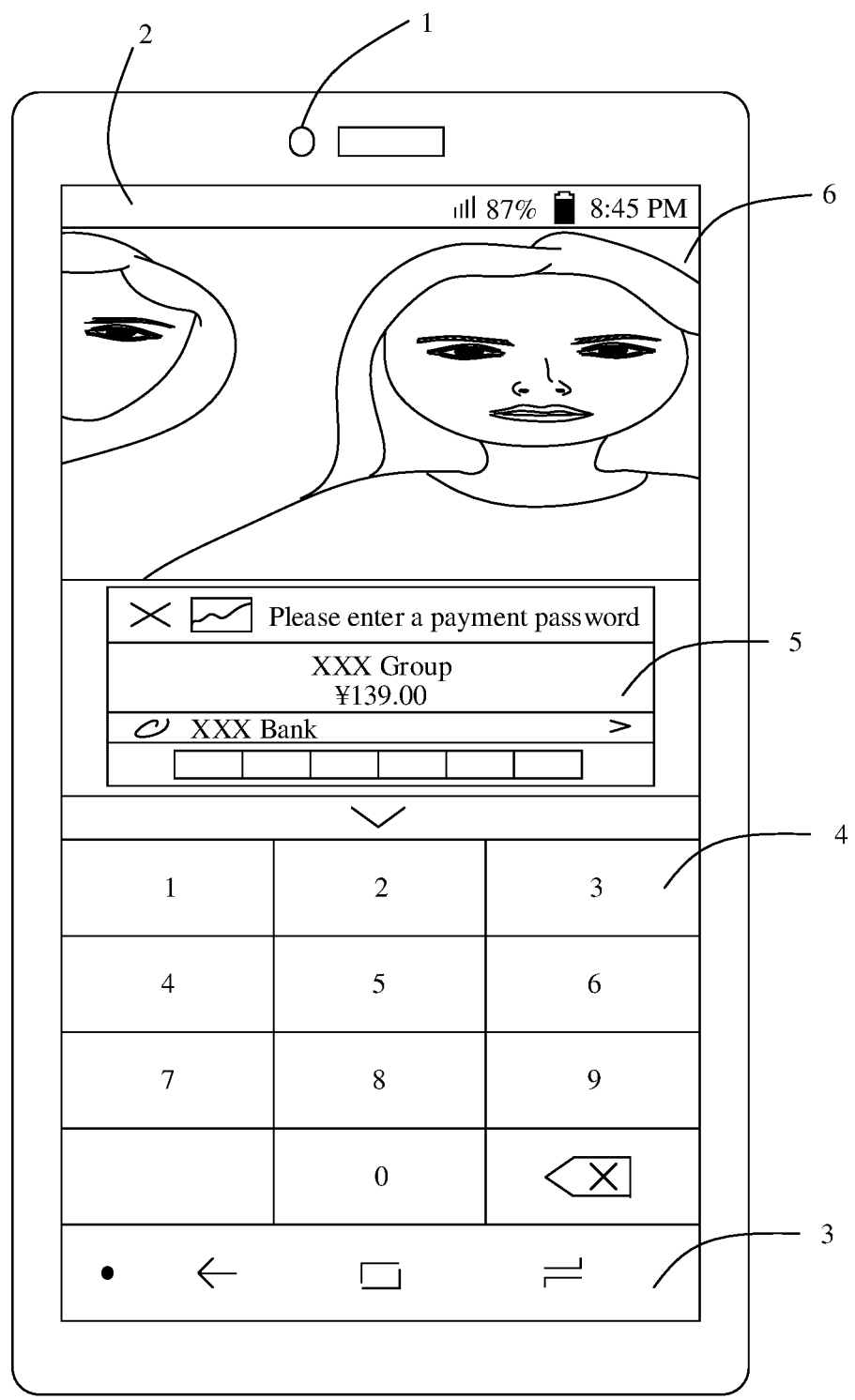
FIG. 6(a) and FIG. 6(b) are a first type of schematic diagrams of split-screen displaying when a terminal is in portrait mode for watching according to an embodiment of the present invention.
Figure 6B:
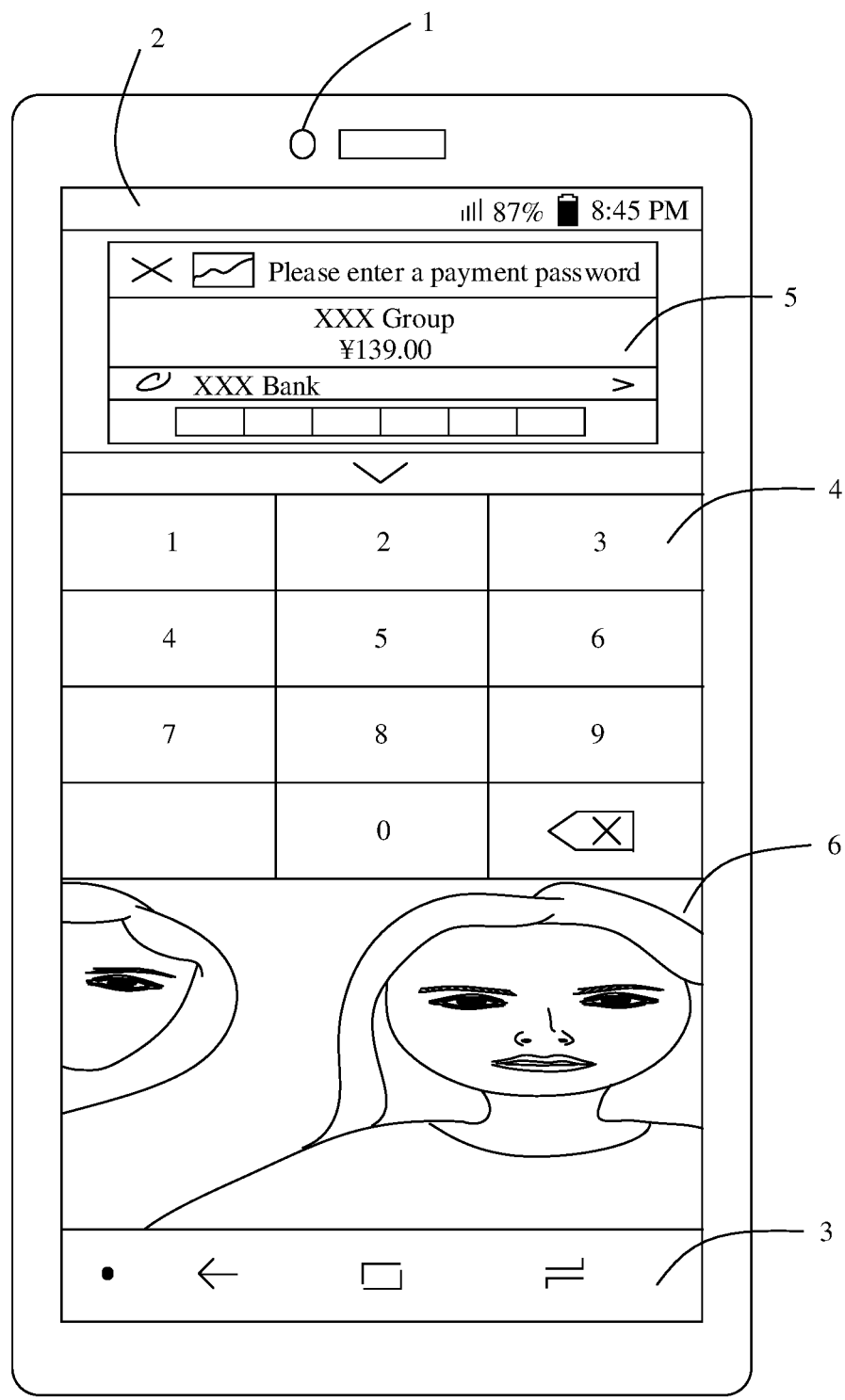
Figure 7A:
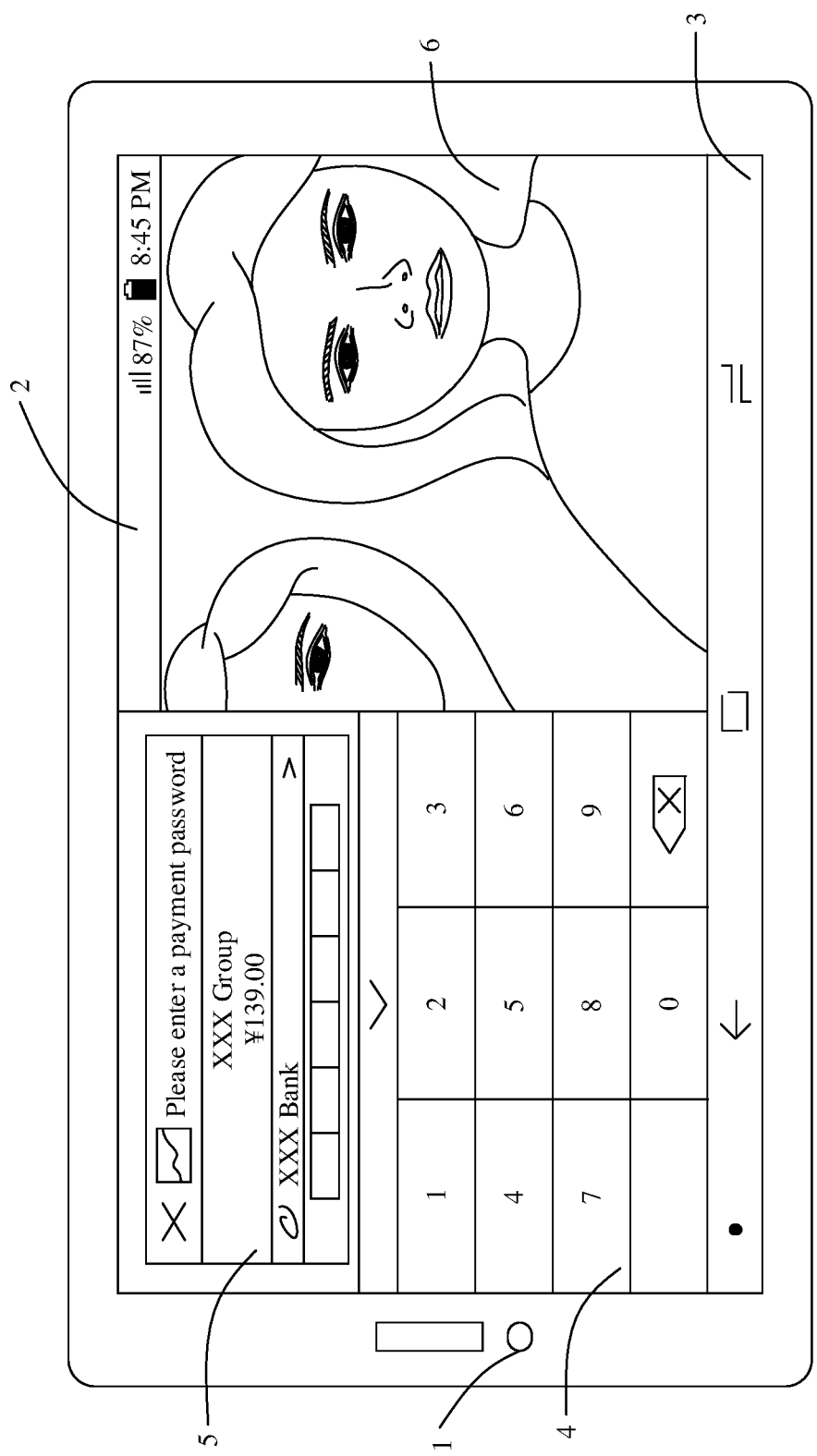
FIG. 7(a) and FIG. 7(b) are schematic diagrams of split-screen displaying when a terminal is in landscape mode for watching according to an embodiment of the present invention.
Figure 7B:
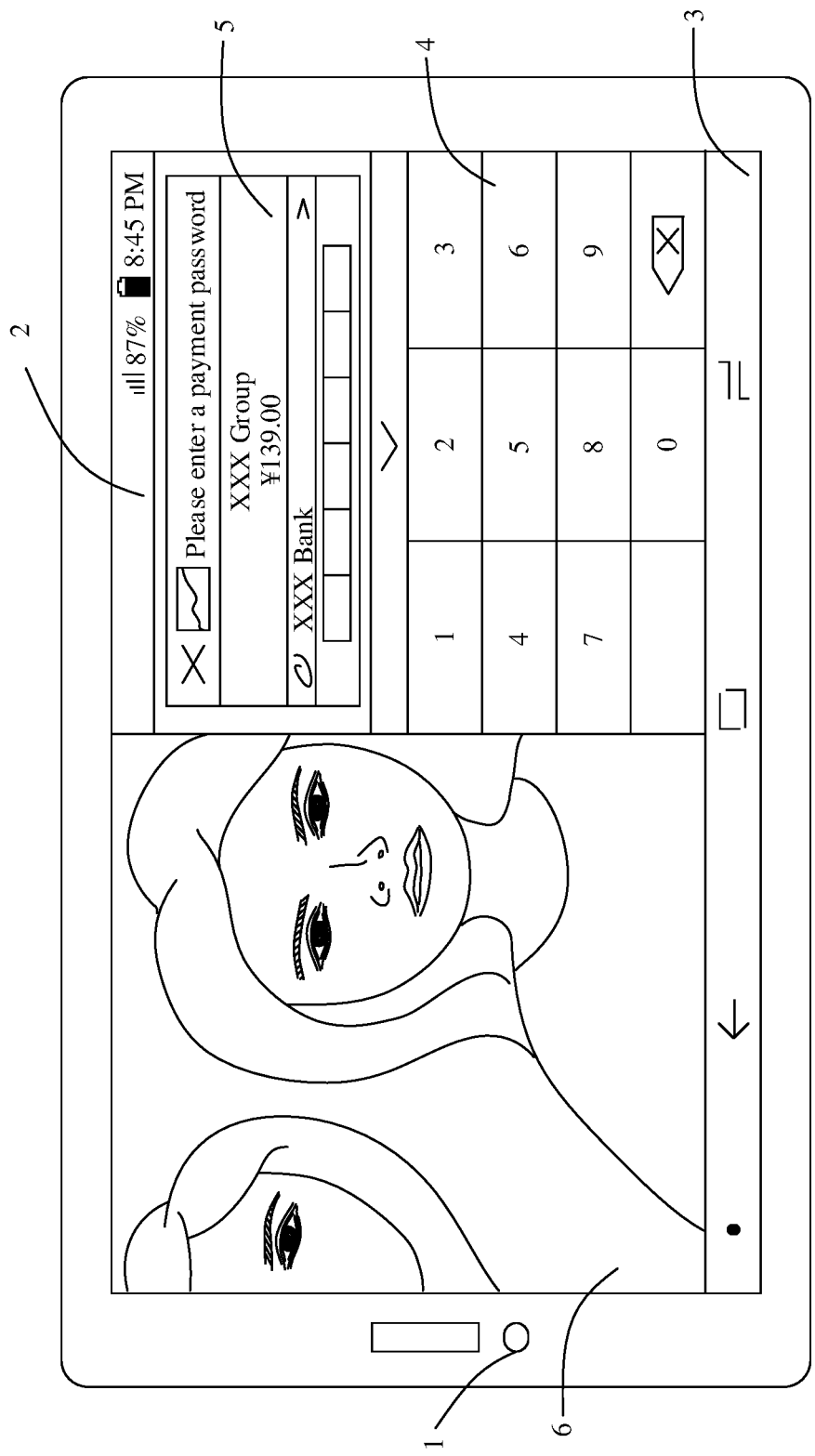
Figure 8:
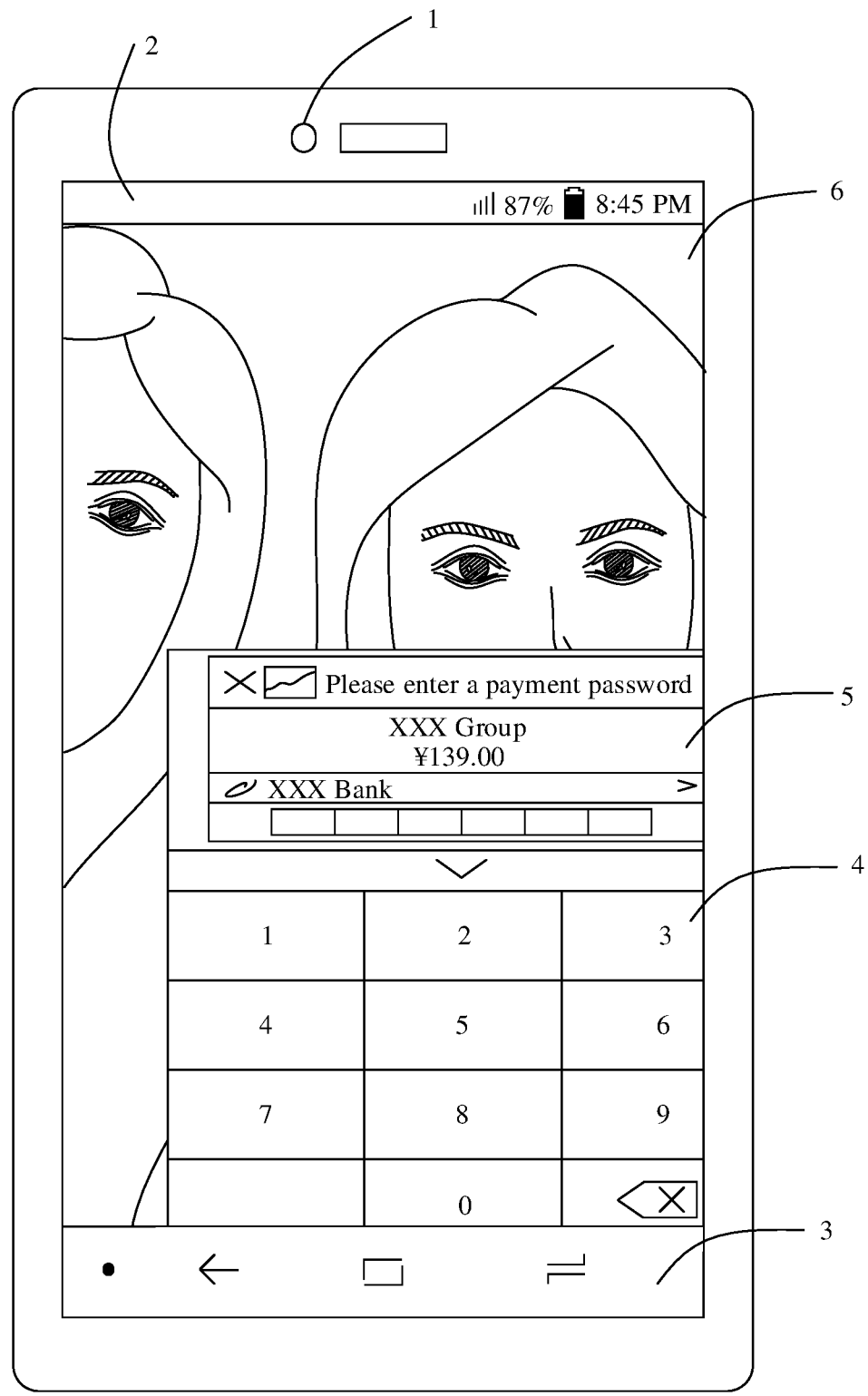
FIG. 8 is a second type of schematic diagram of split-screen displaying when a terminal is in portrait mode for watching according to an embodiment of the present invention.

Assuming that an interface currently presented by the terminal is the running interface of the application shown in FIG. 4, before the running interface of the application is presented on the display screen in a split-screen displaying mode, the running interface of the application also needs to be scaled down, as shown in FIG. 6(a) and FIG. 6(b) or FIG. 7(a) and FIG. 6(b), the target interface is obtained after the running interface of the application shown in FIG. 4 is adjusted according to the first proportion, in other words, the target interface is obtained after the running interface of the application is scaled down according to the first proportion, such as an application interface including a payment dialog box and a digital keyboard shown in FIG. 6(a) and FIG. 6(b) to FIG. 8. It should be noted that, compared with the running interface of the application, the content presented on the target interface may not change, and only a size and definition of the running interface of the application change.

It should be noted that, in a process of scaling down the application interface, the application interface may be scaled down by an area, or the running interface of the entire application may be scaled down in an equal proportion. This is not limited herein.

The running interface of the application shown in FIG. 4 is used as an example. For example, considering that a user currently needs to input a password to implement a payment function, to facilitate a user operation, in a process of scaling down the running interface of the application, only the payment dialog box is scaled down, and an original presentation proportion of the digital keyboard may be retained. In this way, for the user, in a process of inputting the password, because the digital keyboard retains an original display size on the running interface of the application, the user may retain an original input habit, and complete a password inputting process in an original input manner, for example, as shown in FIG. 6(a) and FIG. 6(b) to FIG. 8.

Figure 12:
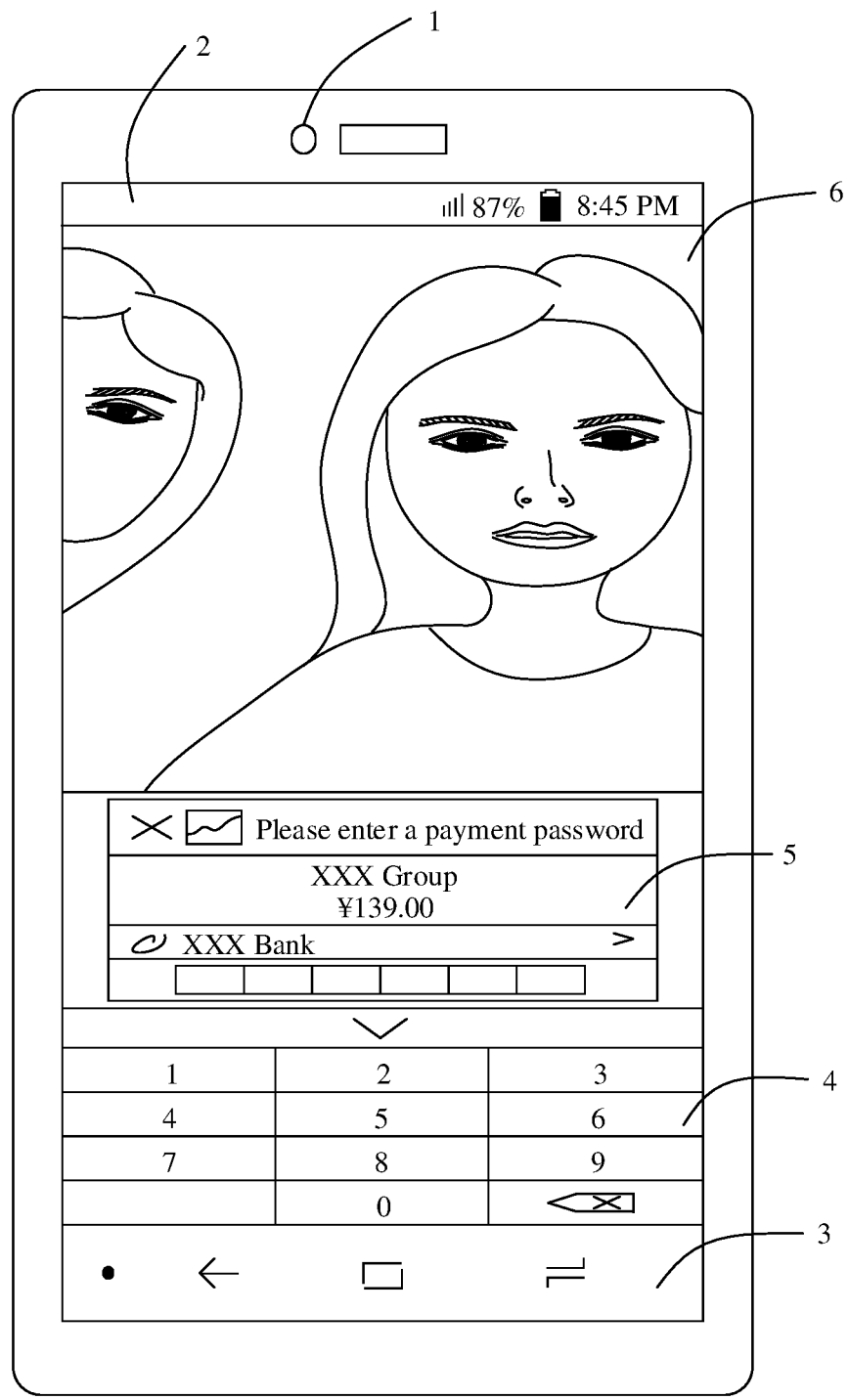
FIG. 12 is another schematic diagram of split-screen displaying when a terminal is in portrait mode for watching according to an embodiment of the present invention.

For another example, considering that the user expects to more clearly watch an image collected by using a front-facing camera, the user certainly expects that a proportion of the target interface in the display screen is smaller. In this case, in a process of scaling down the running interface of the application to generate the target interface, not only the payment dialog box may be scaled down, similarly, the digital keyboard may also be scaled down according to a certain proportion, as shown in FIG. 12. It should be noted that an area in which the payment dialog box is located and an area in which the digital keyboard is located may be scaled down according to a same proportion, or may be scaled down according to different proportions. This may be set by the user in advance according to an operation habit, an operational requirement, and the like of the user. This is not limited herein. This means that the first proportion may include one proportion parameter or a plurality of proportion parameters. When only one proportion parameter is included, the terminal scales down the running interface of the application according to this proportion, and when the plurality of proportion parameters are included, the terminal may divide the running interface of the application into at least two areas, and each area or a plurality of areas is/are scaled down according to a same proportion parameter. In this way, the target interface may be obtained after all areas on the running interface of the application are scaled down according to some same proportion parameters or all different proportion parameters.

Figure 13:
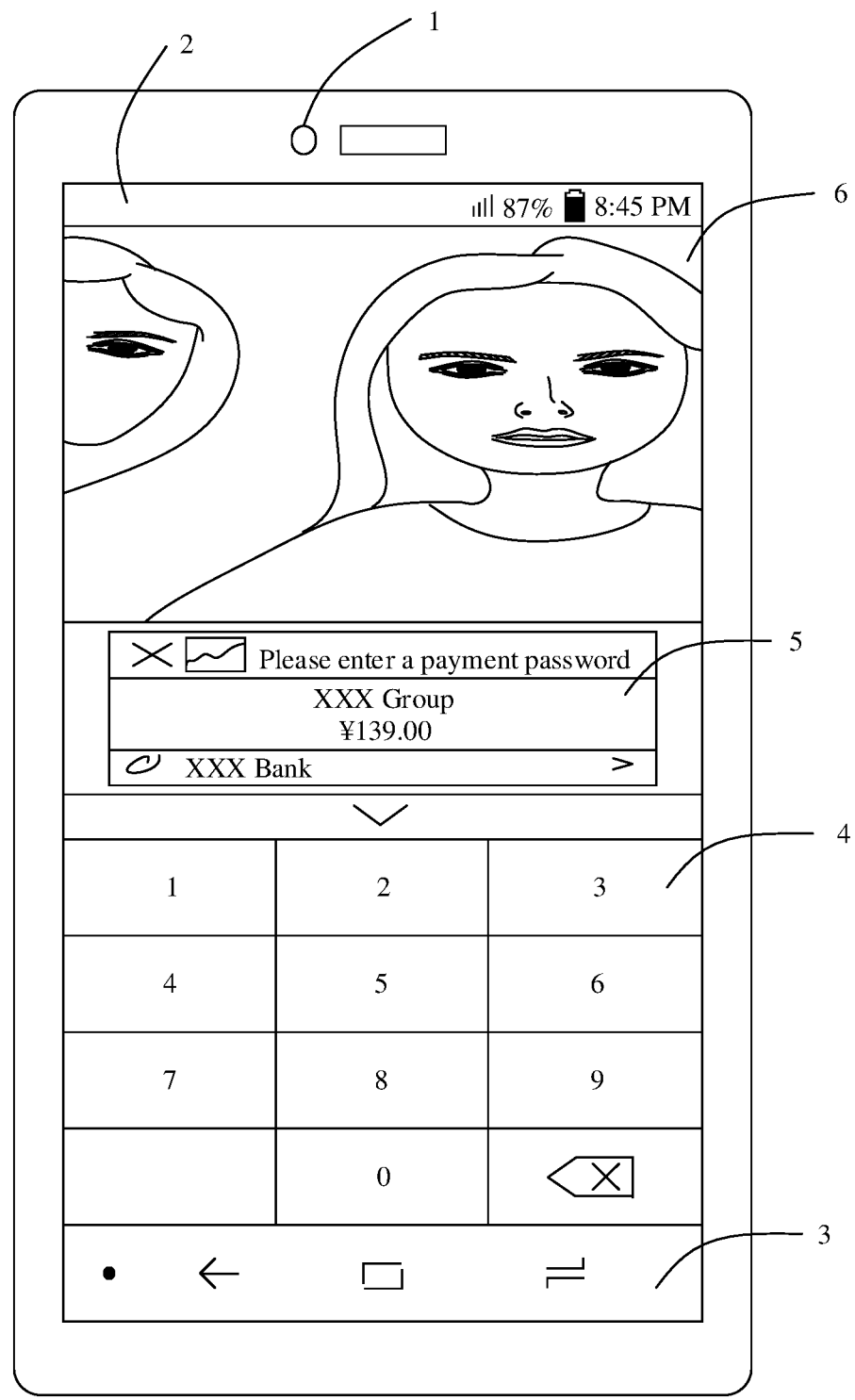
FIG. 13 is a first type of schematic diagram of a display interface according to an embodiment of the present invention.

For another example, considering that the user not only expects to clearly watch the image collected by using the front-facing camera, but also does not expect to affect an actual password input operation, in other words, the user does not want to use a scaled down keyboard to implement a password input process, in this embodiment of the present invention, a partial area on the running interface of the application may be scaled down only by using a specific proportion. For example, as shown in FIG. 13, only an area in which the payment dialog box is located is scaled down, a presentation effect of an area in which an original digital keyboard is located is retained, and in a process of scaling down the area in which the payment dialog box is located, a part of unimportant information is shielded, in other words, a part of area is deleted, to ensure that an area in which a scaled down payment dialog box is located occupies less presentation space on the display screen. For example, a password input by the user is generally presented in the payment dialog box, to ensure security of input information, the password is generally replaced with a specific character for display, and this means that although this part of content is presented to the user, no substantial information can be conveyed. Therefore, in this embodiment of the present invention, this part of less important area may be hidden or deleted, in other words, the content is not presented in a displaying process.

Figure 14:
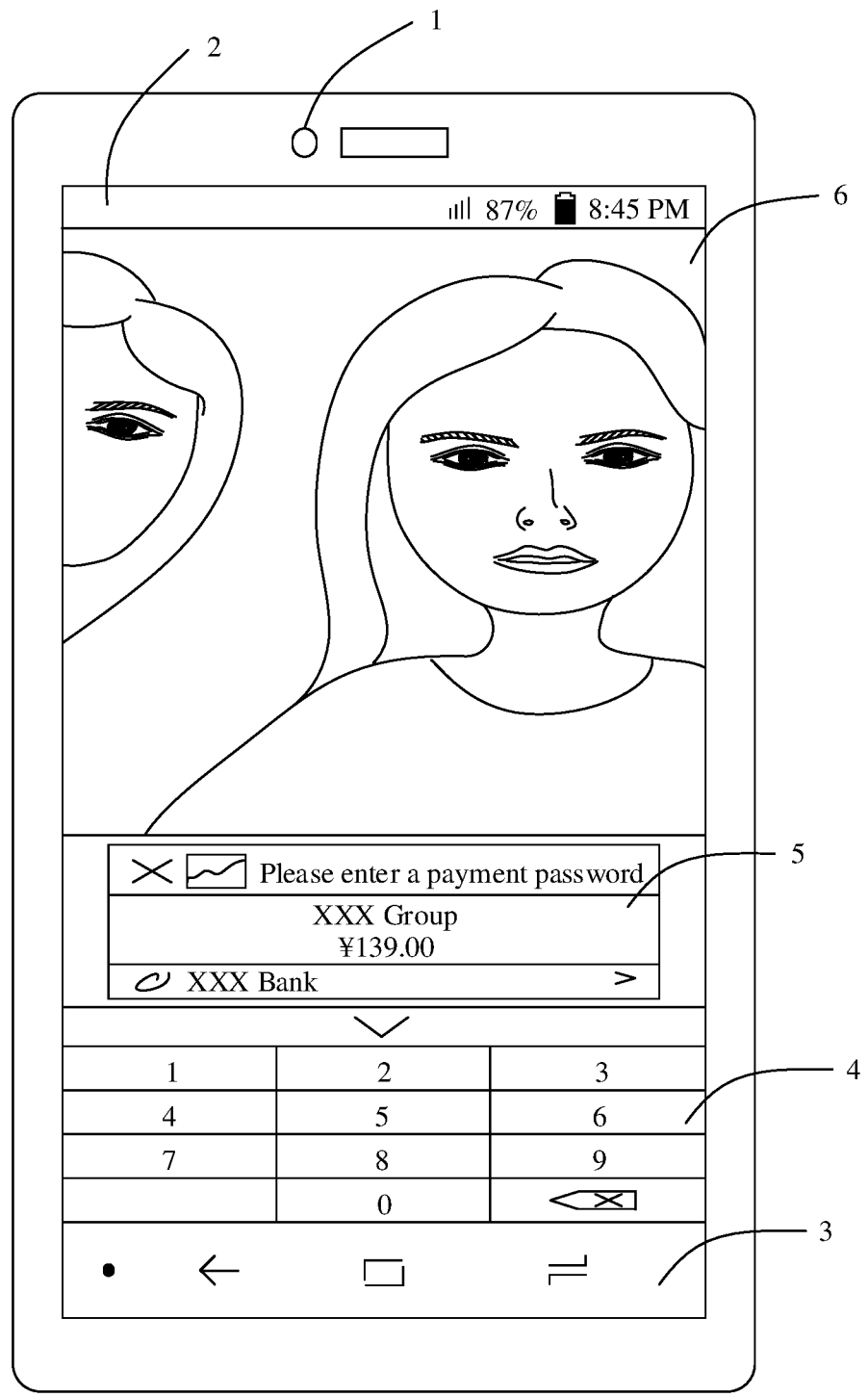
FIG. 14 is a second type of schematic diagram of a display interface according to an embodiment of the present invention.

For another example, considering that the user only expects to more clearly watch the image collected by using the front-facing camera, in a process of scaling down and presenting the running interface of the application, this part of unimportant area may be hidden or deleted, and running interfaces of some applications that need to be retained are scaled down, as shown in FIG. 14.

It can be learned that, in the foregoing process of "scaling down a running interface of an application according to a first proportion, to obtain a target interface", the "scaling down the application interface" may include only a scaling-down operation, or include a scaling-down or hiding (which may also be considered as deletion) operation. In addition, the first proportion may include at least one proportion parameter used to scale down an entire area or a partial area on the running interface of the application. This is not limited in this embodiment of the present invention, and the foregoing content is merely used as a possible example. It should be noted that, displaying in portrait mode is used as an example in the foregoing content, and is also applicable to a case of displaying in landscape mode. Details are not described herein.

Step 302: Adjust, according to a second proportion, the image collected by using the front-facing camera, to obtain a target image.

Assuming that the image collected by the terminal by using the front-facing camera is an image shown in FIG. 5, the image may be considered as an original collected image. For example, a pixel of the original image is the same as a pixel of a display image on the display screen, and before the image is presented on the display screen in a split-screen displaying mode, the original image needs to be scaled down, in other words, adjusting the pixel of the original image. In this process, the original image is usually blurred due to a pixel change. Therefore, the image collected by using the front-facing camera in FIG. 6(*a*) and FIG. 6(*b*), FIG. 7(*a*) and FIG. 6(*b*), and FIG. 12 to FIG. 14 may be considered as the target image obtained after the original image is adjusted according to the second proportion, in other words, the target image obtained after the original image is scaled down according to the second proportion. It should be noted that, compared with the original image, content presented in the target image may not change, and only the pixel is adjusted. In this embodiment of the present invention, it may also be considered as changes in an image size and definition.

It should be noted that, in addition to the foregoing implementation, only a partial area in the image may be adjusted by using the second proportion, and then an adjusted partial area is presented as the target image. This implementation is proposed below, and details are not described herein.

Step 303: When the image collected by the camera meets a preset condition, the display screen separately presents a target image and a target interface in two display windows.

It can be learned that, in a process of simultaneously displaying the target interface and the target image in the split-screen displaying mode, a presentation proportion needs to be adjusted between the image collected by using the front-facing camera and the displayed running interface of the application, to ensure that content finally presented on the display screen can better meet a current user requirement. In addition, in a process of combining and displaying the image collected by using the front-facing camera and the displayed running interface of the application on a same display screen, adjustment may be performed according to a different proportion with reference to the user requirement, and/or a partial area may be selectively hidden or deleted with reference to the user requirement. In this way, effectively split-screen displaying is implemented.

To present the image of the another user more clearly, in a possible implementation of this embodiment of the present invention, the area in which the another user is located in the image collected by using the front-facing camera may be adjusted, the adjusted specified area is used as the target image, and is presented on the display interface. Therefore, in step 302, that the image collected by using the front-facing camera is adjusted according to the second proportion to obtain the target image may be implemented as step 401 and step 402.

Step 401: Obtain an area in which another user is located in an image collected by using a front-facing camera.

Figure 15:
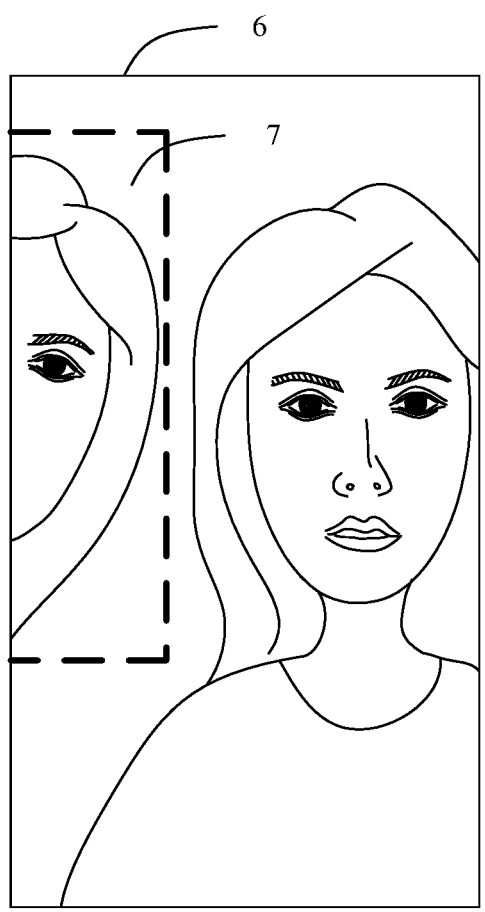
FIG. 15 is a schematic diagram of marking, based on FIG. 5, an area in which another user is located according to an embodiment of the present invention.
Figure 16A:
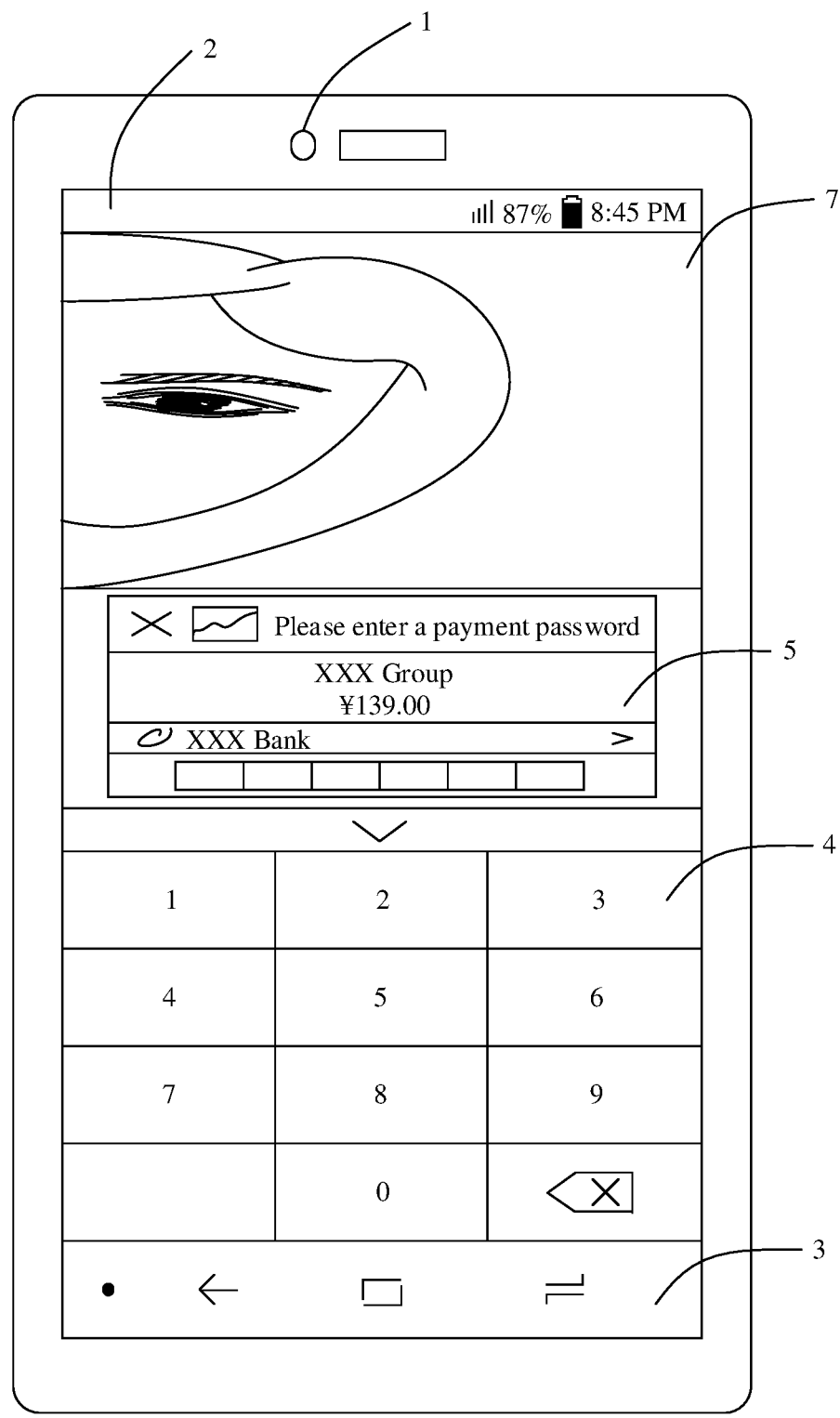
FIG. 16(*a*), FIG. 16(*b*), FIG. 16(*c*), and FIG. 16(*d*) are a third type of schematic diagrams of a display interface according to an embodiment of the present invention.
Figure 16B:
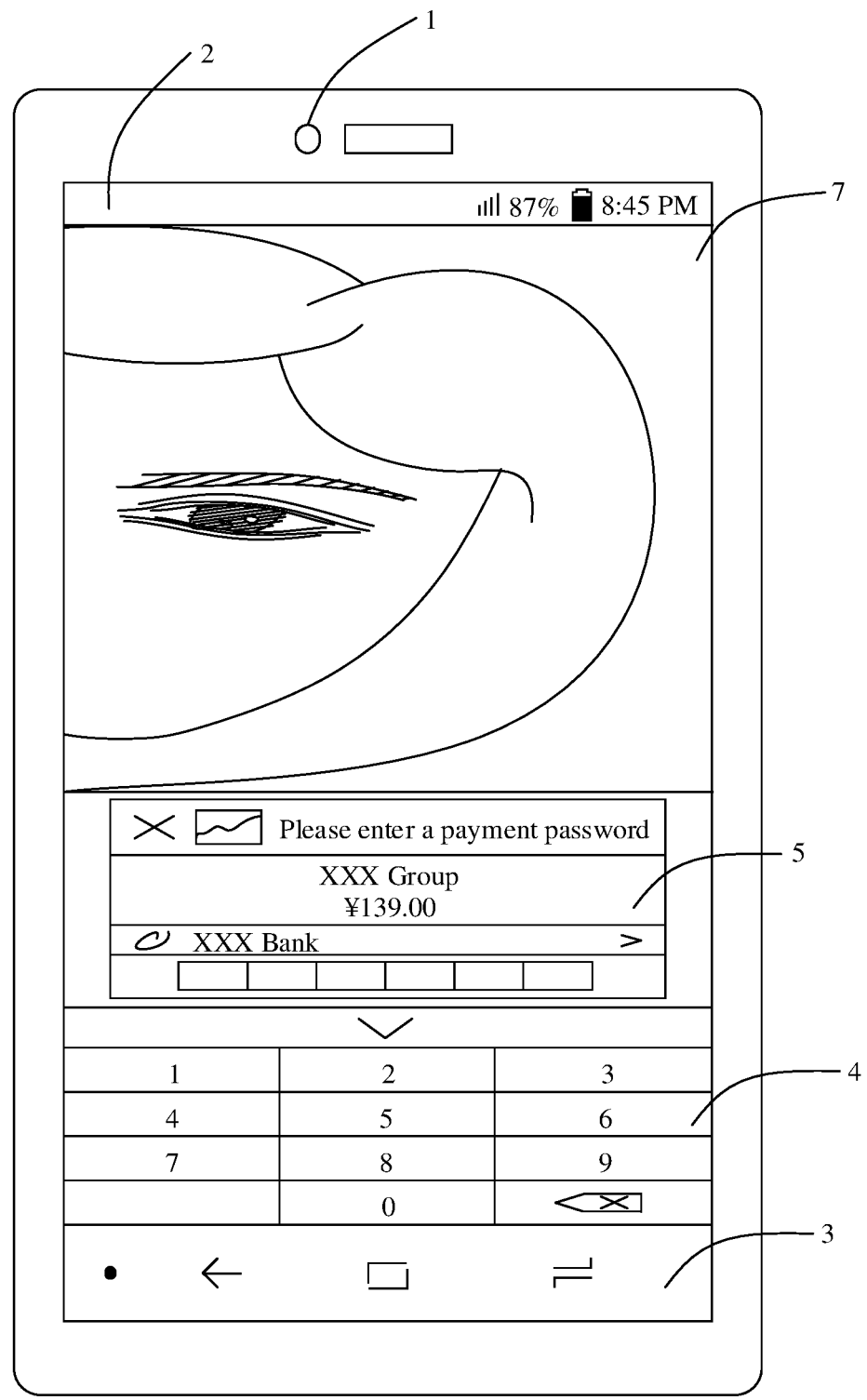
Figure 16C:
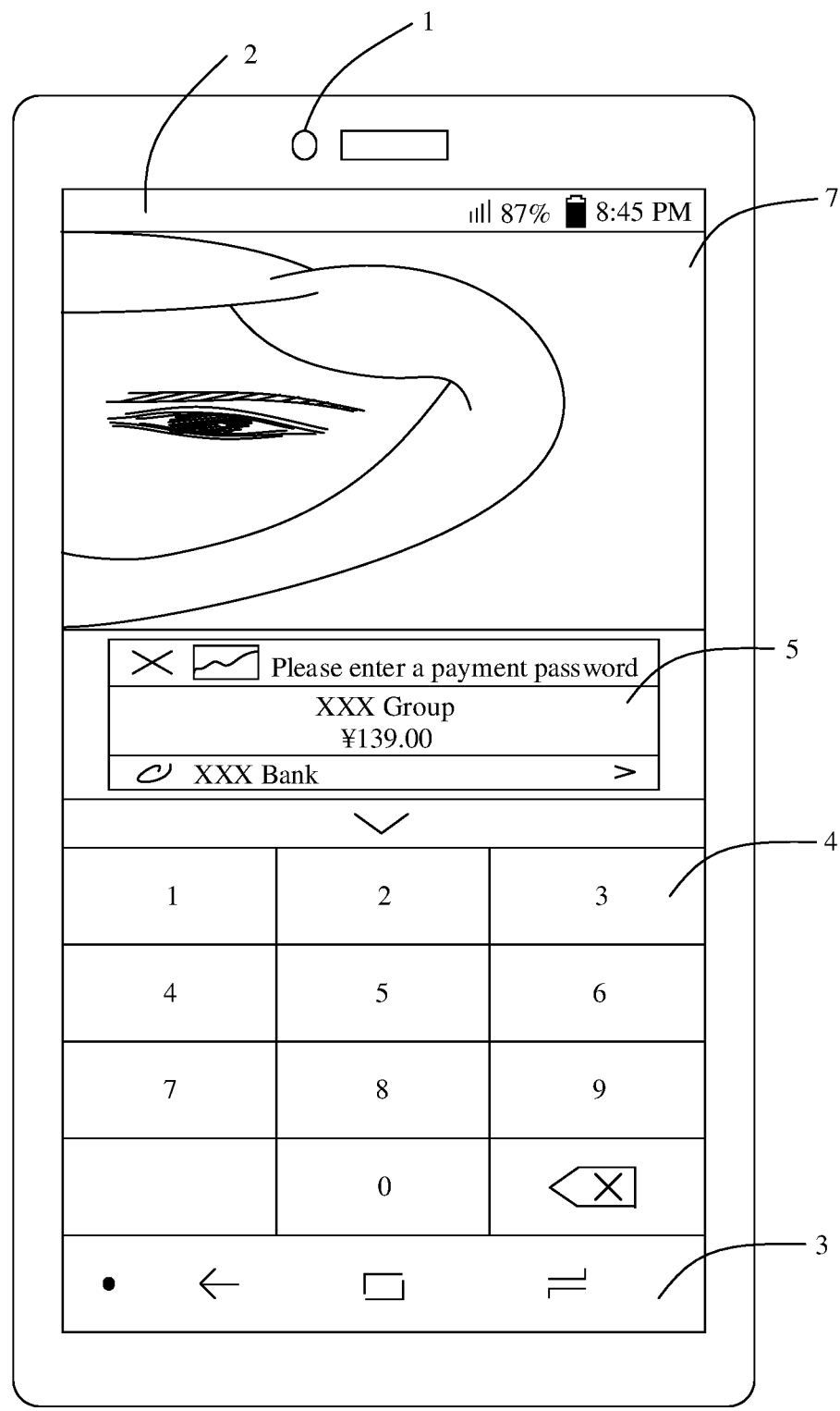
Figure 16D:
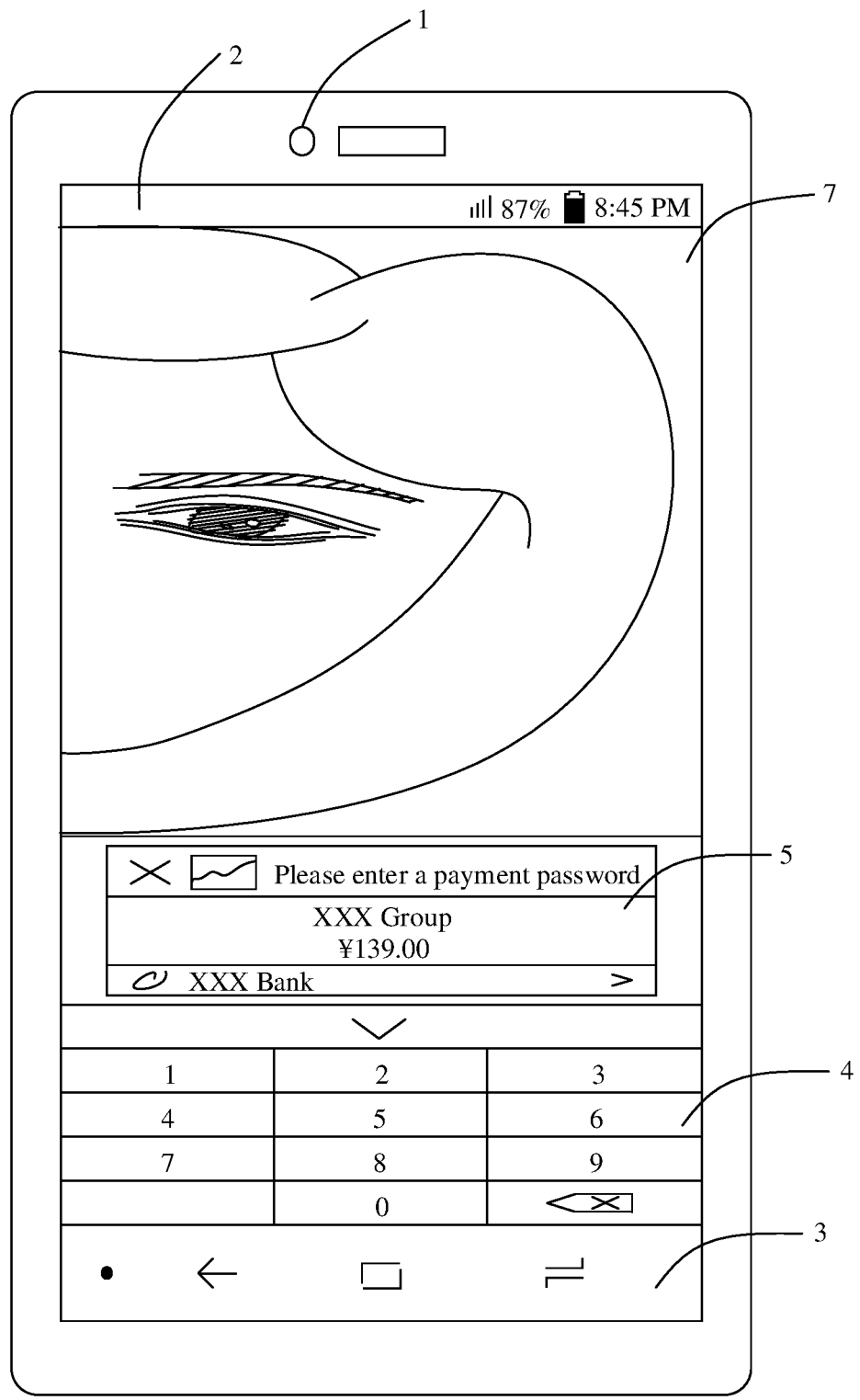

In an example in which FIG. 5 shows an image collected by the terminal by using the front-facing camera, a part outlined by a dashed line in FIG. 15 may be considered as the area in which the another user is located, in other words, the area in which the another user is located in this embodiment of the present invention. In this embodiment of the present invention, a specified area may be determined from the image by using technologies such as facial recognition and iris recognition. A manner of determining the specified area is not limited herein.

Step 402: Adjust the specified area according to a second proportion, to obtain a target image.

In this embodiment of the present invention, that the area in which the another user is located is scaled up or down is determined based on both a size of the specified area and a size of the target image presented on the display screen, to obtain the target image. For example, if a size of an area outlined by a dashed line is less than a size of an area finally presented on the display screen, the area outlined by the dashed line may be scaled up according to a specific proportion. On the contrary, if a size of an area outlined by a dashed line is greater than a size of an area finally presented on the display screen, the area outlined by the dashed line may be scaled down according to a specific proportion. It should be noted that, considering that a length-width proportion of the area outlined by the dashed line may be different from a length-width proportion of a target image that can be finally presented on the display screen. A length and a width of the image may be separately processed with reference to an actual display requirement. For example, a horizontal length of the area outlined by the dashed line is scaled up for display and a vertical length of the area outlined by the dashed line is scaled down for display, or a horizontal length of the area outlined by the dashed line is scaled down for display and a vertical length of the area outlined by the dashed line is scaled up for display. This is not limited herein.

Considering that a pixel of the front-facing camera is generally above 8 million and that a pixel of some front-facing cameras may even reach 20 million or more, a mainstream full-high-definition (Full High Definition, FHD) display screen can generally reach 2 million pixels. It means that a pixel of an image presented on the display screen is far lower than a pixel of the image collected by using the front-facing camera. It can be learned that the collected image presented on the display screen is usually displayed on the display screen after a plurality of pieces of pixel information collected by using the front-facing camera are compressed into one display pixel point. Therefore, to ensure definition of the split-screen displaying, when the area in which the another user is located needs to be extracted, after the area in which the another user is located is determined, an actual pixel point in the area in which the another user is located may be restored, in other words, a pixel corresponding to the area in which the another user is located in an image actually collected by using the front-facing camera. Then, pixel information is compressed based on the pixel corresponding to the area in which the another user is located in the image actually collected by using the front-facing camera, and a corresponding display pixel that conforms to an area of an image displayed on the final display screen is finally obtained, as shown in FIG. 16(a), FIG. 16(b), FIG. 16(c), and FIG. 16(d) and FIG. 17(a) and FIG. 17(b). Content shown in FIG. 16(a), FIG. 16(b), FIG. 16(c), and FIG. 16(d) is similar to that shown in FIG. 6(a) and that shown in FIG. 12 to FIG. 14. A difference lies in that a position in which an image is displayed is replaced from an area in which the image collected by using the front-facing camera is located to an area in which the another user in the image collected by using the front-facing camera is located. For content of other parts, refer to descriptions corresponding to in FIG. 6(a) and text descriptions corresponding to FIG. 12 to FIG. 14. Details are not described herein again.

Figure 17A:
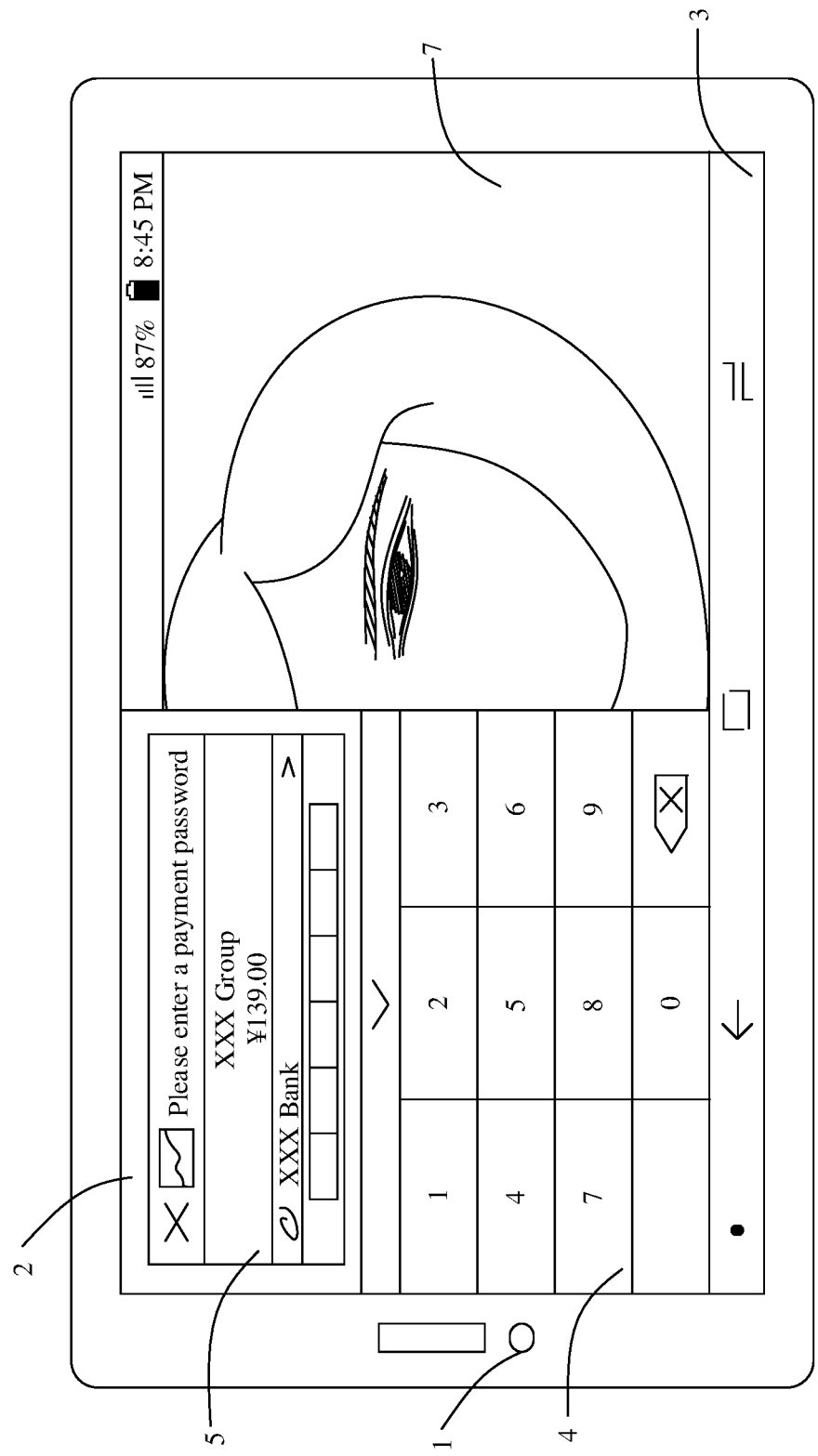
FIG. 17(*a*) and FIG. 17(*b*) are a fourth type of schematic diagrams of a display interface according to an embodiment of the present invention.
Figure 17B:
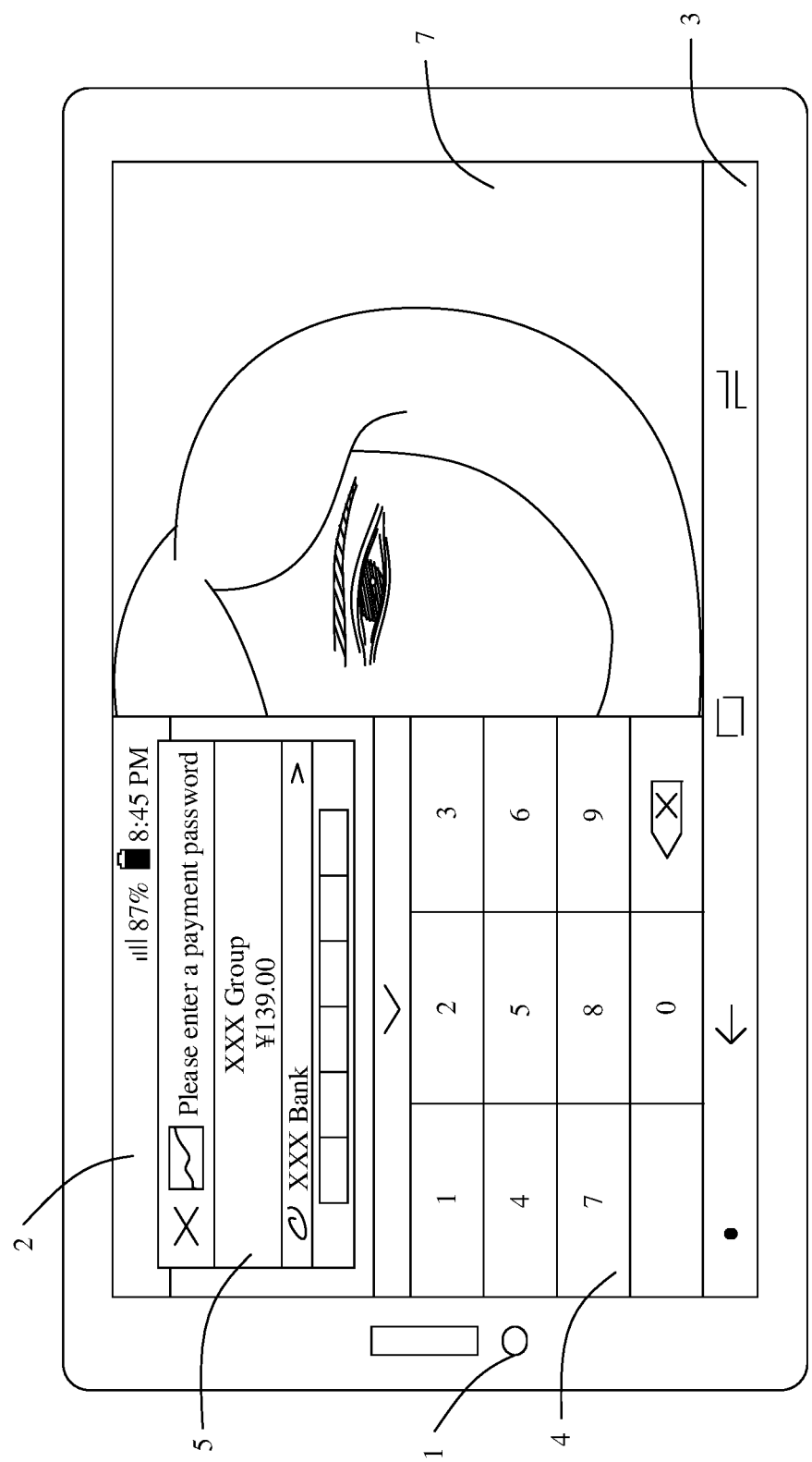

In addition, this embodiment of the present invention is also applicable to displaying in landscape mode, as shown in FIG. 17(a) and in FIG. 17(b). A difference between FIG. 17(a) and FIG. 17(b) lies in that display positions of function areas displaying parameters such as a battery level, time, and a network status are different. With reference to an actual user requirement, this part of content may be selected to be displayed or not displayed on the display screen. In addition, if the display is allowed, the user may select a display position. When the content is watched in landscape mode by default, the function area may be displayed on an upper right of the screen. If an image presented in this case is rightly on a right side of the display screen, to enable the user to watch a clearer image (in other words, an image is displayed in a larger area on the right side of the display screen), the function area may be displayed on a left side of the display screen. This is not limited herein.

Generally, an area in which the another user that is a peeper occupies only a very small area in the image collected by using the front-facing camera. If the area in which the another user is located is directly partially scaled up and displayed, a pixel point cannot be effectively used, and imaging definition of the area in which the another user is located is usually reduced. However, after using the foregoing processing solution, the pixel point can be effectively used, so that the area in which the another user is located is clearly displayed on the display screen, for watching and obtaining subsequent evidence by the user.

Figure 18:
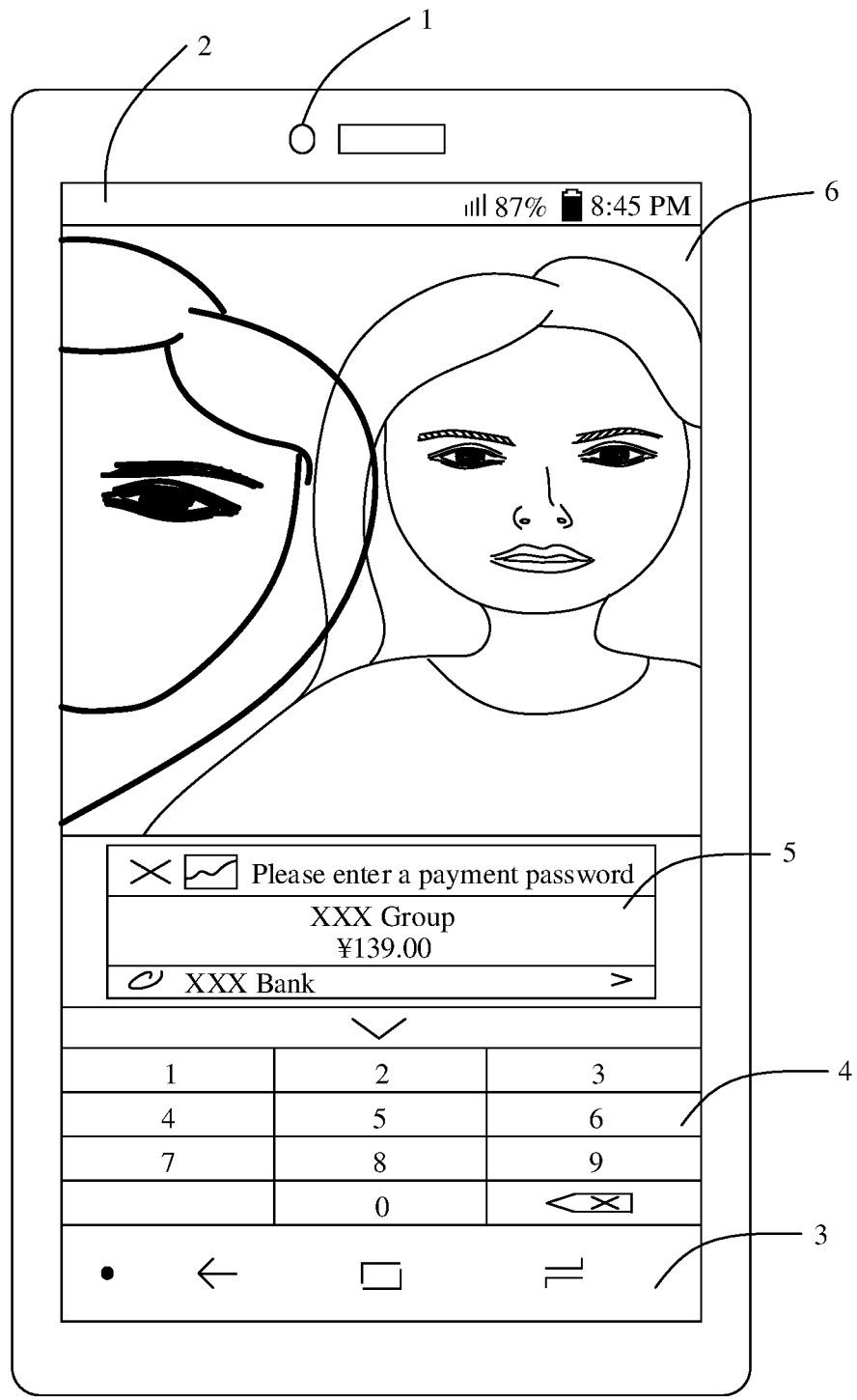
FIG. 18 is a fifth type of schematic diagram of a display interface according to an embodiment of the present invention.

In this embodiment of the present invention, the terminal may obtain the target image in a presentation manner in which the terminal superimposes partial scaled-up area in which the another user is located onto the image collected by using the front-facing camera. For example, FIG. 15 shows an image collected by using a front-facing camera. During split-screen displaying, content presented on a display screen may be an interface shown in FIG. 18. It should be noted that the area after being scaled up in which the another user is located is superimposed onto the image collected by using the front-facing camera, to avoid affecting an overall presentation effect, an important contour line in the area in which the another user is located may be bold for display, and/or transparency of each pixel in the image collected by using the front-facing camera is increased, and/or an important contour line in the image collected by using the front-facing camera is tapered for display, or the like. This is not limited herein. An objective of the foregoing possible processing situation lies in that the area in which the another user is located is more clearly presented to the user, and the image collected by an original front-facing camera is displayed in a dimmed manner. Certainly, to more clearly present the area in which the another user is located, the area in which the another user is located may be displayed after a frame is added, in other words, a superimposition effect of the two layers of images is presented to the user. In addition, a position of an image on an upper layer or a bottom layer may be adjusted by sliding, dragging, or the like.

It can be learned that, after the at least a partial area of the image collected by using the front-facing camera is enlarged, the first image presented to the user includes the enlarged image and the application interface. After the foregoing processing, the user can watch the clearer image of the area in which the another user is located. This may be more beneficial to subsequent evidence producing.

Considering that in an image collection process, focus and exposure are implemented by the front-facing camera by using a center of a collection area as a position of a focus window by default, in a possible implementation of this embodiment of the present invention, to make the area in which the another user that is a peeper is located clearer, before the image is collected by using the front-facing camera in step 202, step 501 may be further performed, and after step 501 is performed, step 502 may be further performed.

Step 501: Adjust a focus window of a front-facing camera to an area in which a user other than a preset user is located.

Figure 19:
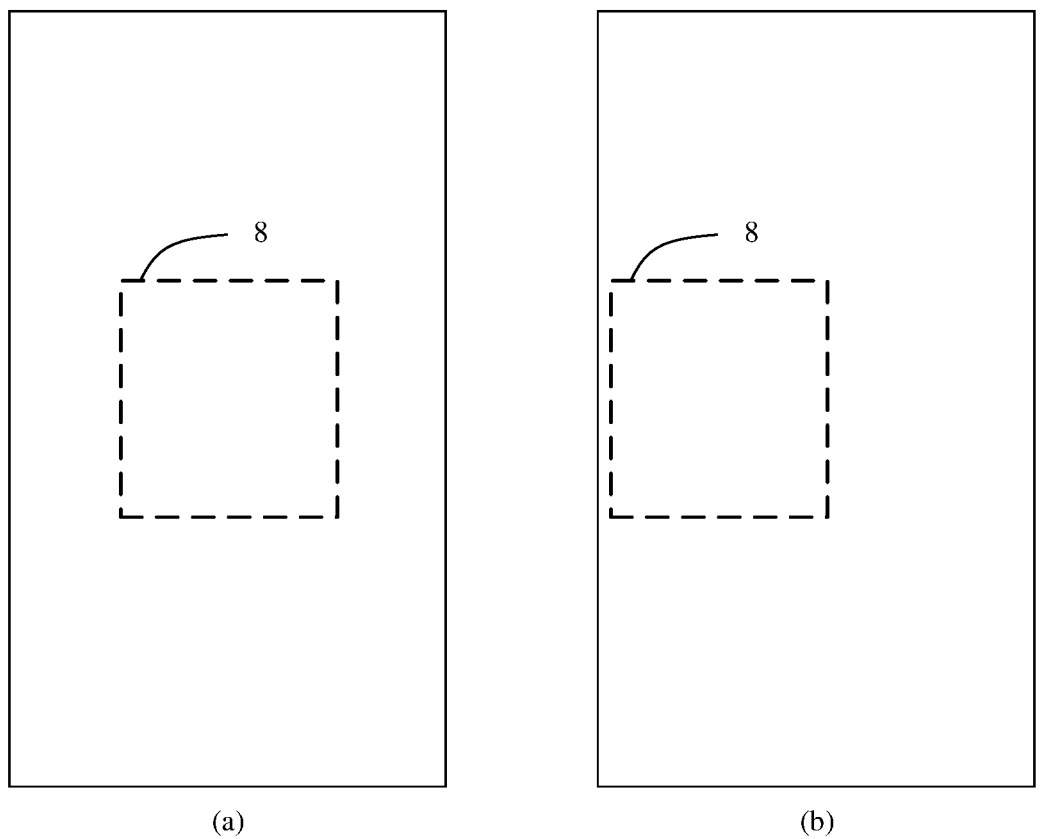
FIG. 19 is a schematic diagram of positions of a focus window before and after adjustment according to an embodiment of the present invention.

The image shown in FIG. 15 is used as an example. A position of an original focus window is a position shown in FIG. 19(*a*), in other words, a central area of the image. After adjustment, a position of the focus window may be a position shown in FIG. 19(*b*), in other words, the area in which the user other than the preset user is located.

It should be noted that an adjusted focus window at least partially overlaps the area in which the another user is located. This means that the adjusted focus window may be completely located in the area in which the another user is located, or cover a part of the area in which the another user is located, or cover the entire area in which the another user is located. This is not limited herein. In this embodiment of the present invention, it suffices to ensure that after the focus window is adjusted, focus on the area in which the another user is located can be better implemented.

Figure 20:
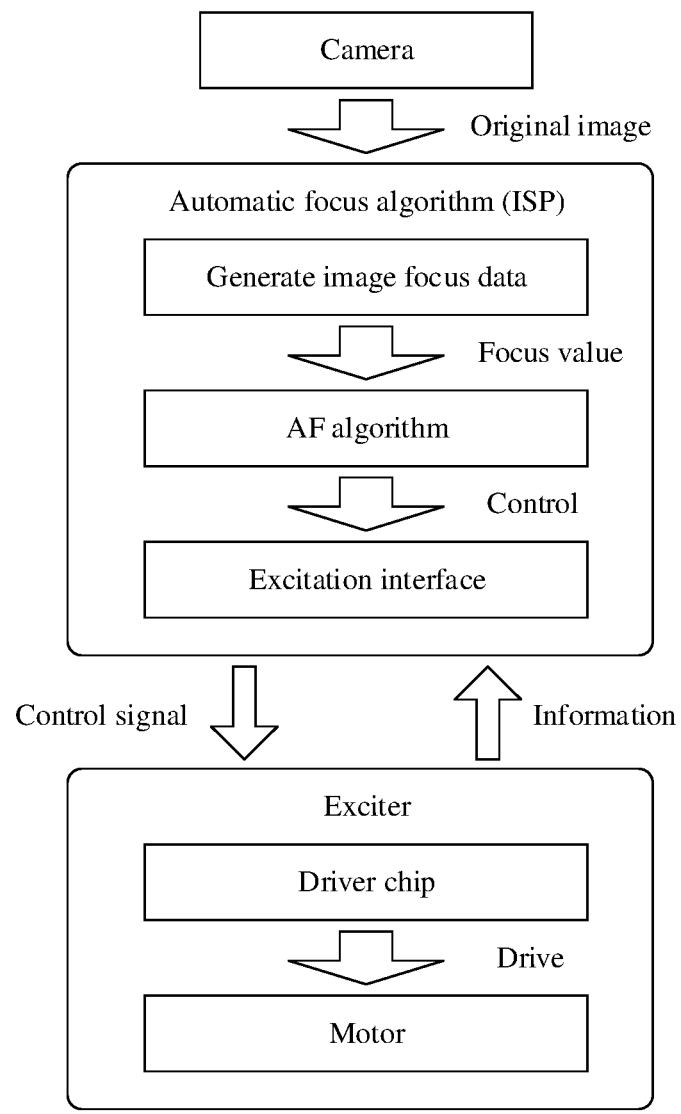
FIG. 20 is a schematic diagram of a focus window adjustment process according to an embodiment of the present invention.

As shown in FIG. 20, FIG. 20 is a schematic diagram of a focus window adjustment process. After a camera (in other words, a front-facing camera) collects an image (in other words, an original image), image focus data may be generated by invoking an automatic focus algorithm, and then whether the currently collected original image is clear is determined. A specific implementation process may be calculating a parameter such as a contrast ratio by using an AF algorithm, to measure whether the original image is clear. If the original image is not clear, a control signal is sent to an exciter through an excitation interface, to notify a driver chip (Driver IC) of an amplitude that is adjusted by driving a motor. Then, the drive chip drives the motor to adjust a lens position, and feeds back adjusted information to the excitation interface.

In an actual operation process, the foregoing focus window adjustment may be implemented after the terminal identifies the another user and determines the area in which the another user is located, and may also be implemented by the user in a manual adjustment manner in which the user directly performs an operation such as tapping or sliding on the display screen. This is not limited herein.

It can be learned that, in this embodiment of the present invention, an image of the area in which the another user finally presented is clearly by adjusting the focus window.

Step 502: Adjust exposure weights of different areas in the image based on a current position of the focus window.

Figure 21:
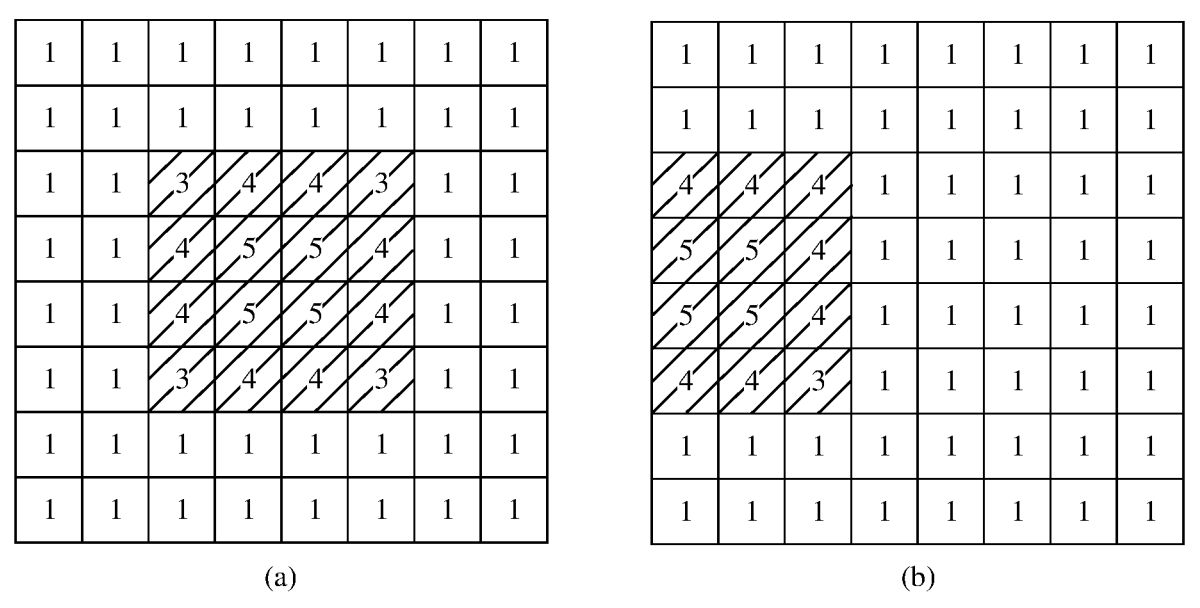

Based on the focus window adjustment, the terminal may further increase definition of the image in the area in which the another user is located by adjusting an exposure weight of a partial area or an entire area of a specified area. It should be noted that, in this embodiment of the present invention, the collected image may be divided into several small windows, for example, 8×8, and a corresponding weight is allocated to each small window. For example, a schematic diagram of the exposure weight shown in FIG. 21(*a*) is used as an example. A larger number indicates a higher exposure weight of this part of area (in other words, a small window). In other words, it is necessary to emphatically consider whether an area with a comparatively high exposure weight has appropriate brightness in an imaging process. After the focus window is adjusted, in other words, after the focus window is adjusted from a central area to a left area of the center, an exposure weight of the image may also be adjusted properly. A schematic diagram of an adjusted exposure weight is a schematic diagram shown in FIG. 21(*b*).

Obviously, an exposure weight is higher at an area closer to a position of the focus window. A weight of the area, at an edge, in which the another user is located is increased, to dynamically adjust exposure time and a gain, thereby ensuring that brightness of the area in which the another user is located is proper. This can avoid a problem caused by overexposure or underexposure of the area in which the another user is located in the image collected by using the front-facing camera. Overexposure causes excessively high brightness of image, and underexposure causes excessively low brightness of the image.

Figure 22:
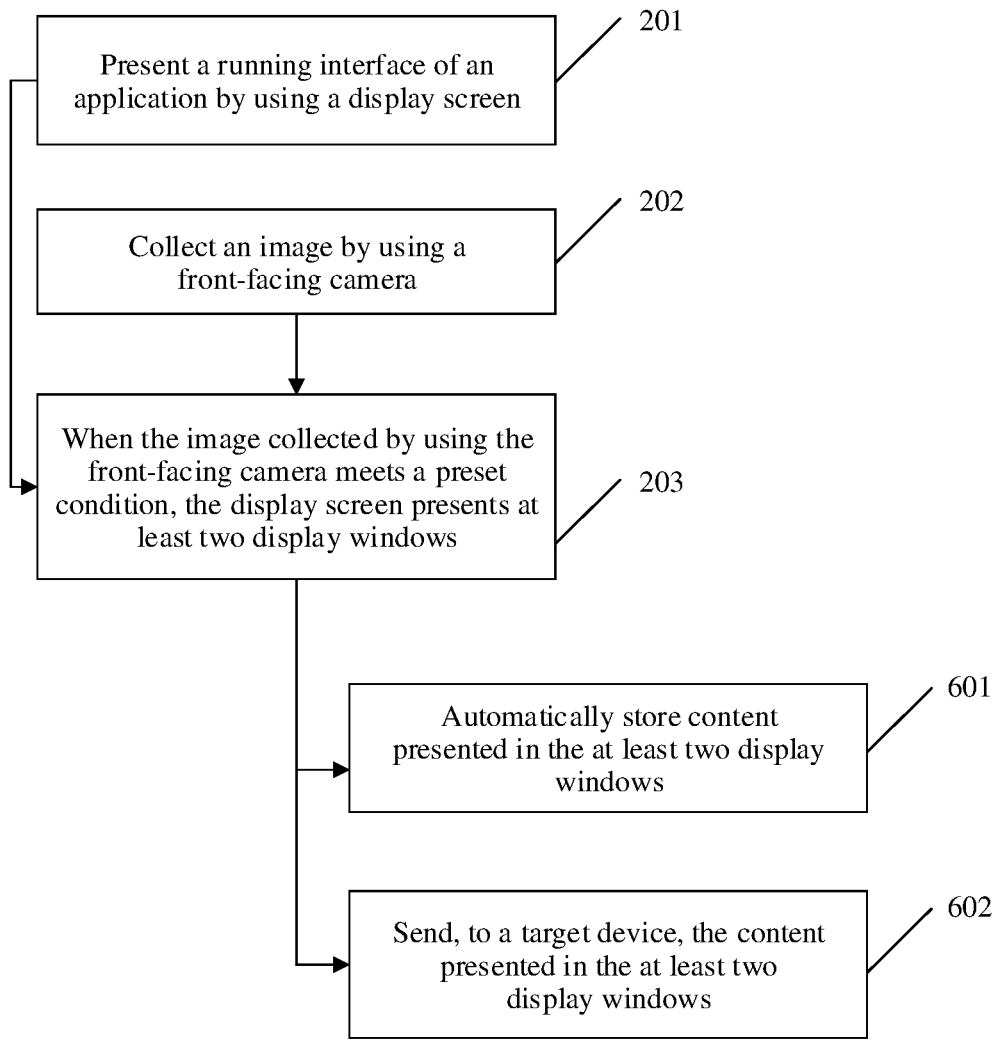
FIG. 22 is a second type of flowchart of a display method according to an embodiment of the present invention.

Considering that evidence not only needs to be obtained to present a peeping behavior of the another user to the user, but also needs to be obtained to subsequently present the collected content to the police or a related law enforcement department, in a possible implementation of this embodiment of the present invention, the collected content may further be stored. The collected content is selectively sent to a device other than the terminal, namely, the target device. Therefore, based on the implementation shown in FIG. 3, an implementation shown in FIG. 22 may be further implemented. After step 203 of presenting the at least two display windows on the display screen is performed, step 601 and/or step 602 may be further performed. Alternatively, step 601 and/or step 602 may be performed when the display screen presents at least two display windows. Alternatively, step 601 and/or step 602 may be performed before the display screen presents at least two display windows. A sequence of performing the steps is not limited in this embodiment of the present invention.

Step 601: Automatically store a first image.

Figure 23:
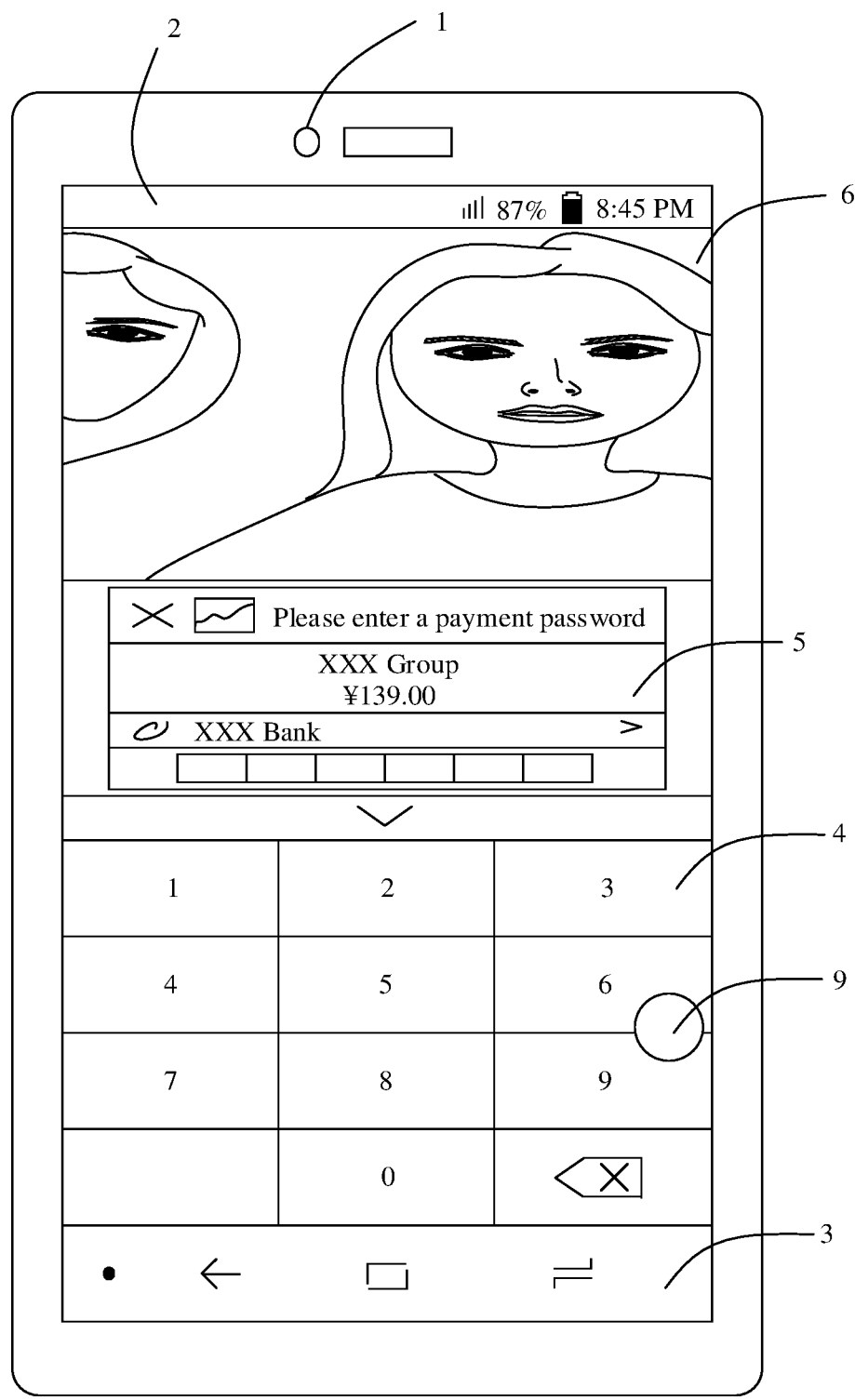
FIG. 23 is a sixth type of schematic diagram of a display interface according to an embodiment of the present invention.

In this embodiment of the present invention, there are a plurality of manners of obtaining the content currently presented on the display screen, for example, operations such as screen capturing and screen recording. For example, a shortcut key similar to a floating window is set on the display screen, and the user may tap the shortcut key to trigger the operations such as screen capturing and screen recording, as shown in FIG. 23. Only one possible existence form of the shortcut key is shown in the figure. The shortcut key may be hidden to be set. When the user needs the shortcut key, the shortcut key is presented by performing an operation such as clicking or sliding. This is not limited herein. In this embodiment of the present invention, the user may alternatively trigger the operations such as screen capturing and screen recording by double tapping a function key or simultaneously tapping at least two function keys. This is not limited herein.

After successfully obtaining the content presented on the current display screen, the terminal may automatically store the obtained content in a preset local storage area for subsequent invoking, watching, or the like by the user.

Step 602: Send, to a target device, the content presented in the at least two display windows.

It should be noted that the terminal may further send, to the target device, the running interface of the application presented on the current display screen and the image collected by using the front-facing camera, to implement an evidence producing function or a storage function. For example, the target device may be a device other than the terminal, or may be a third-party device such as a server configured to implement data storage on a network side.

It can be learned that, in the embodiment of the present invention, the foregoing implementation may be used to store content obtained through evidence collection for subsequent evidence producing, or the related content may be directly submitted to a law enforcement department.

It should be noted that a process of sending, to the target device, the content presented in the at least two display windows may also be implemented as that the terminal automatically sends, to the target device, the content presented in the at least two display windows. This means that after the display screen presents the at least two display windows, to ensure that evidence information is transferred to the e law enforcement department timely or stored to the third-party device as soon as possible, the terminal may be automatically triggered to implement the operation of sending the content presented in the at least two display windows.

Figure 24:
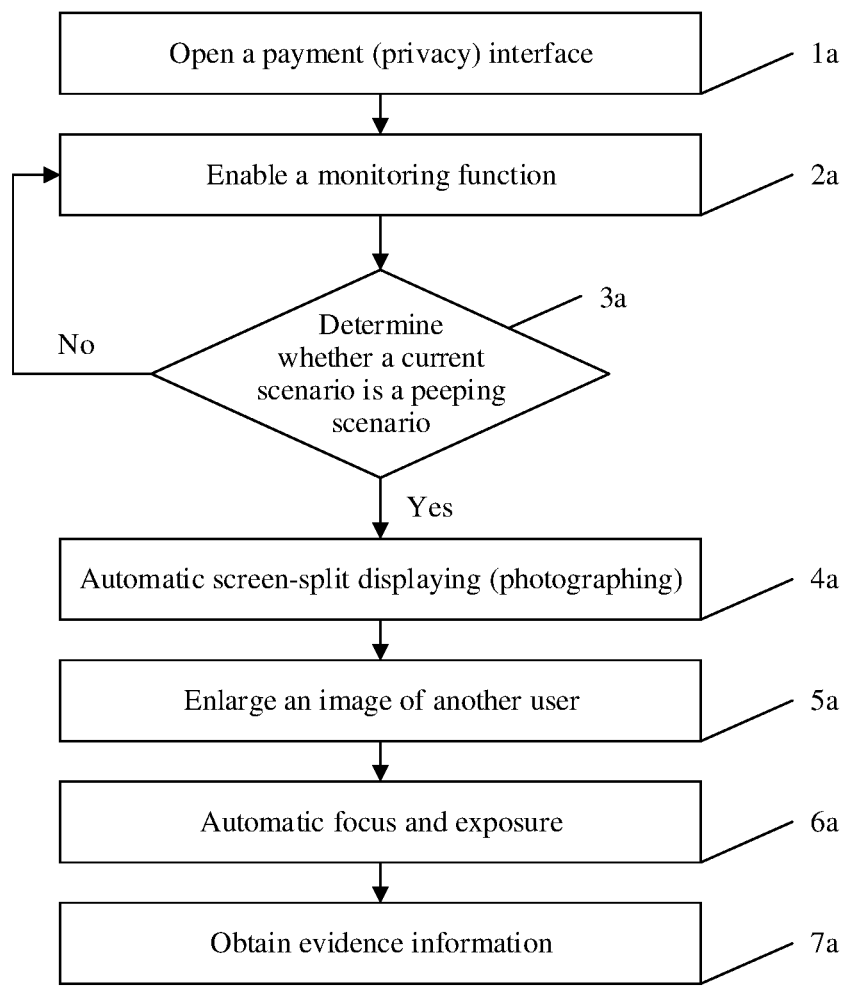
FIG. 24 is a flowchart of an evidence information obtaining method according to an embodiment of the present invention.

For example, FIG. 24 is a flowchart of an evidence information obtaining method according to an embodiment of the present invention. The method includes the following steps.

Step 1a: Open a payment (privacy) interface.

Step 2a: Enable a monitoring function.

It should be noted that the monitoring function refers to that a front-facing camera collects an image, and a terminal monitors content presented on a current display interface and an operation of a user.

Step 3a: Determine whether a current scenario is a peeping scenario. If yes, step 4a is performed; or if not, the monitoring function continues to be performed.

In this embodiment of the present invention, there are a plurality of manners of determining whether a scenario is the peeping scenario, for example, the foregoing mentioned method for determining whether the image collected by using the front-facing camera includes the image of the user other than the preset user.

Step 4a: Implement automatic split-screen displaying (photographing).

In this case, the image is obtained by photographing by using the front-facing camera of the terminal.

Step 5a: Enlarge an image of another user.

To be specific, image enlargement is performed on an area in which the another user is located in the collected image.

Step 6a: Implement automatic focus and exposure.

To be specific, for an enlarged image of the area in which the another user is located, automatic focus is implemented, and the exposure is implemented in combination with a focused image.

Step 7a: Obtain evidence information.

To be specific, an interface presented on the display screen of the current terminal is obtained by using screen capturing or screen recording.

Figure 25:
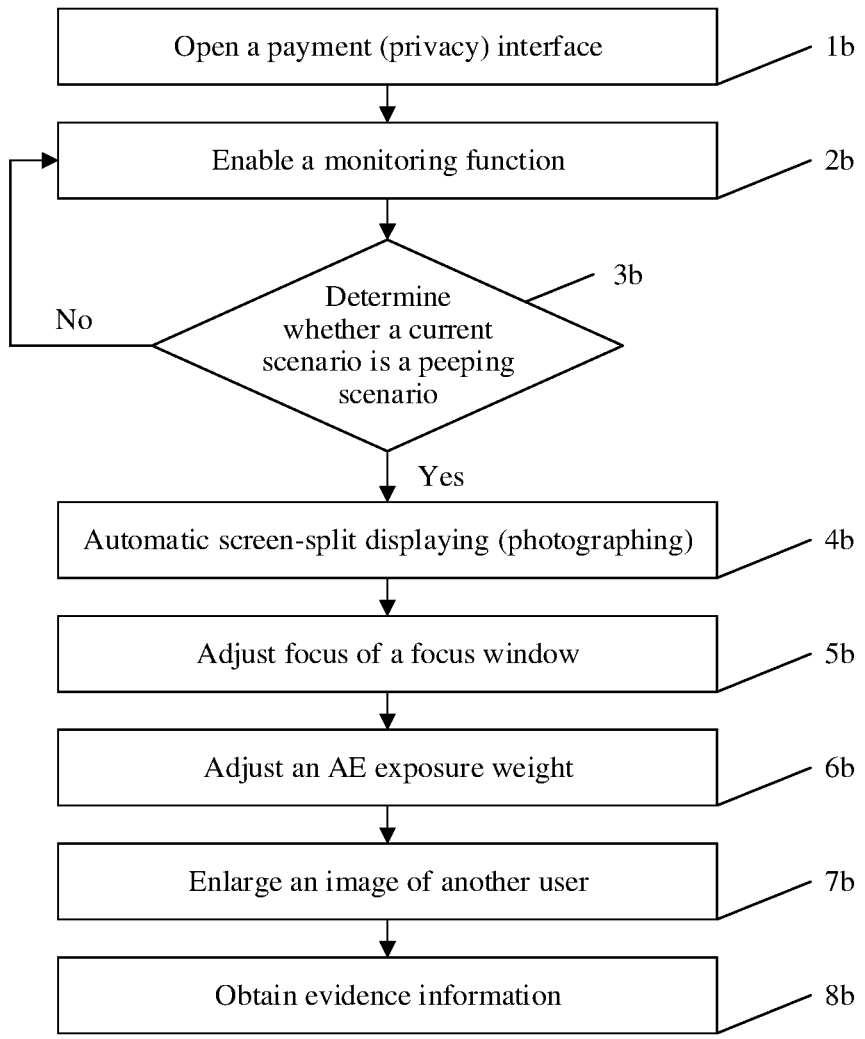
FIG. 25 is another flowchart of an evidence information obtaining method according to an embodiment of the present invention.

For another example, FIG. 25 is a flowchart of another evidence information obtaining method according to an embodiment of the present invention. The method includes the following steps.

Step 1b: Open a payment (privacy) interface.

Step 2b: Enable a monitoring function.

Step 3b: Determine whether a current scenario is a peeping scenario. If yes, step 4b is performed; or if not, the monitoring function continues to be performed.

Step 4b: Implement automatic split-screen displaying (photographing).

Step 1b to step 4b are the same as step 1a to step 4a. Details are not described herein again.

Step 5b: Adjust focus of a focus window.

For a process of adjusting the focus window, refer to text content in the foregoing embodiment. Details are not described herein again.

Step 6b: Adjust an AE exposure weight.

For a process of adjusting the exposure weight, refer to text content in the foregoing embodiment. Details are not described herein again.

Step 7b: Enlarge an image of another user.

Step 8b: Obtain evidence information.

Step 7b is the same as step 5a, and step 8b is the same as step 7a. Details are not described herein again.

Figure 26:
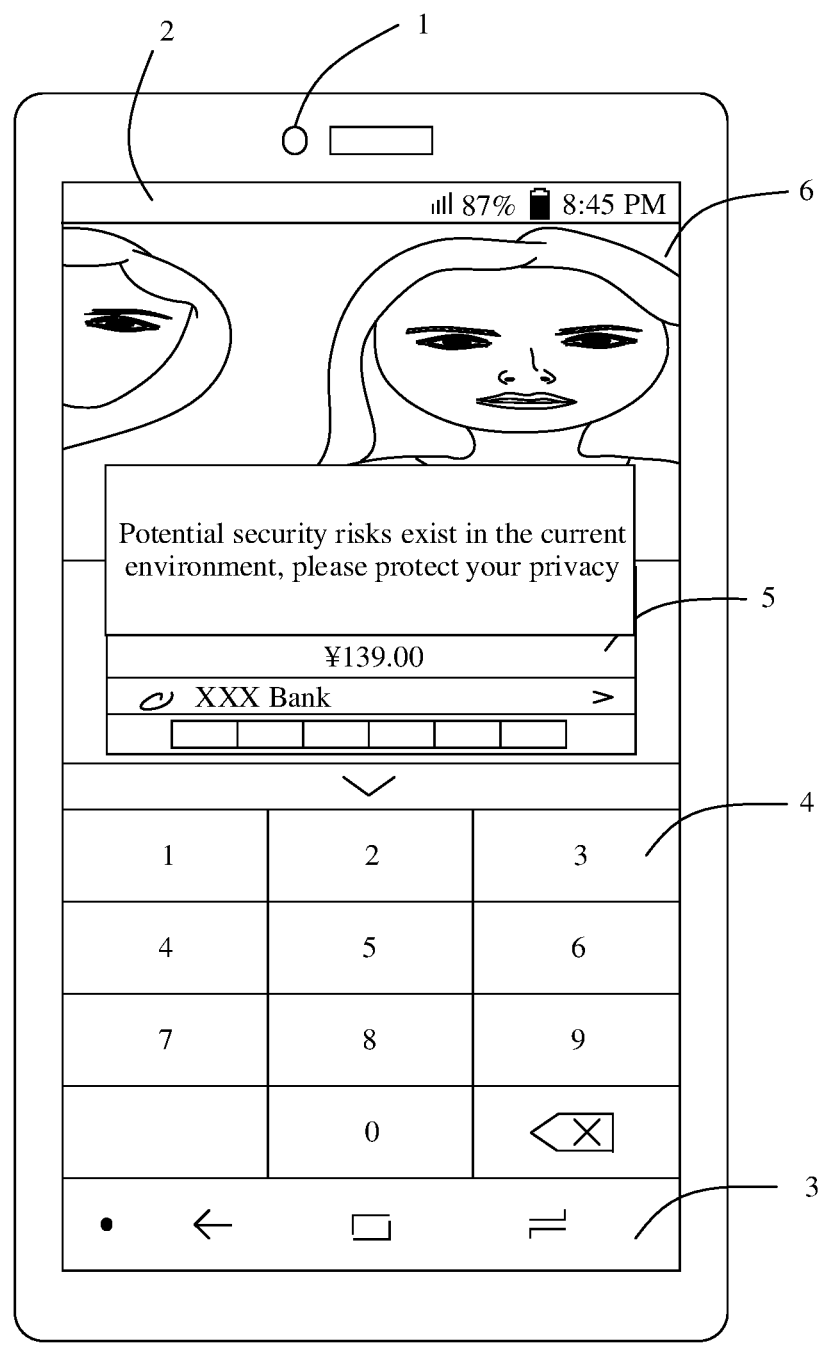
FIG. 26 is a schematic diagram of prompting to pay attention to protecting personal information according to an embodiment of the present invention.

In this embodiment of the present invention, the terminal may send prompt information to prompt the user to pay attention to protecting personal information. FIG. 26 is a schematic diagram of an interface of prompting the user to pay attention to protecting personal information.

In FIG. 26, a terminal pops up a dialog box, and presents, in the dialog box, words "Potential security risks exist in the current environment, please protect personal privacy" is used to prompt the user to pay attention to protecting personal information. It should be noted that, a presentation location of the dialog box, content displayed in the dialog box, a presentation interface used as a background when the dialog box is presented, and the like are not limited to those shown in FIG. 26. The foregoing content is not limited in this embodiment of the present invention. In addition, the terminal may further prompt to pay attention to protecting personal information in a manner of voice prompt, ringing, or the like.

In addition, in FIG. 26, an occasion in which the terminal prompts to pay attention to protecting the personal information is after presenting a first image on the display screen by the terminal. However, in an actual prompting process, the terminal may prompt the user when determining that the application matches the preset application or the image collected by using the front-facing camera meets the preset condition, a prompting occasion is not limited herein.

Figure 27:
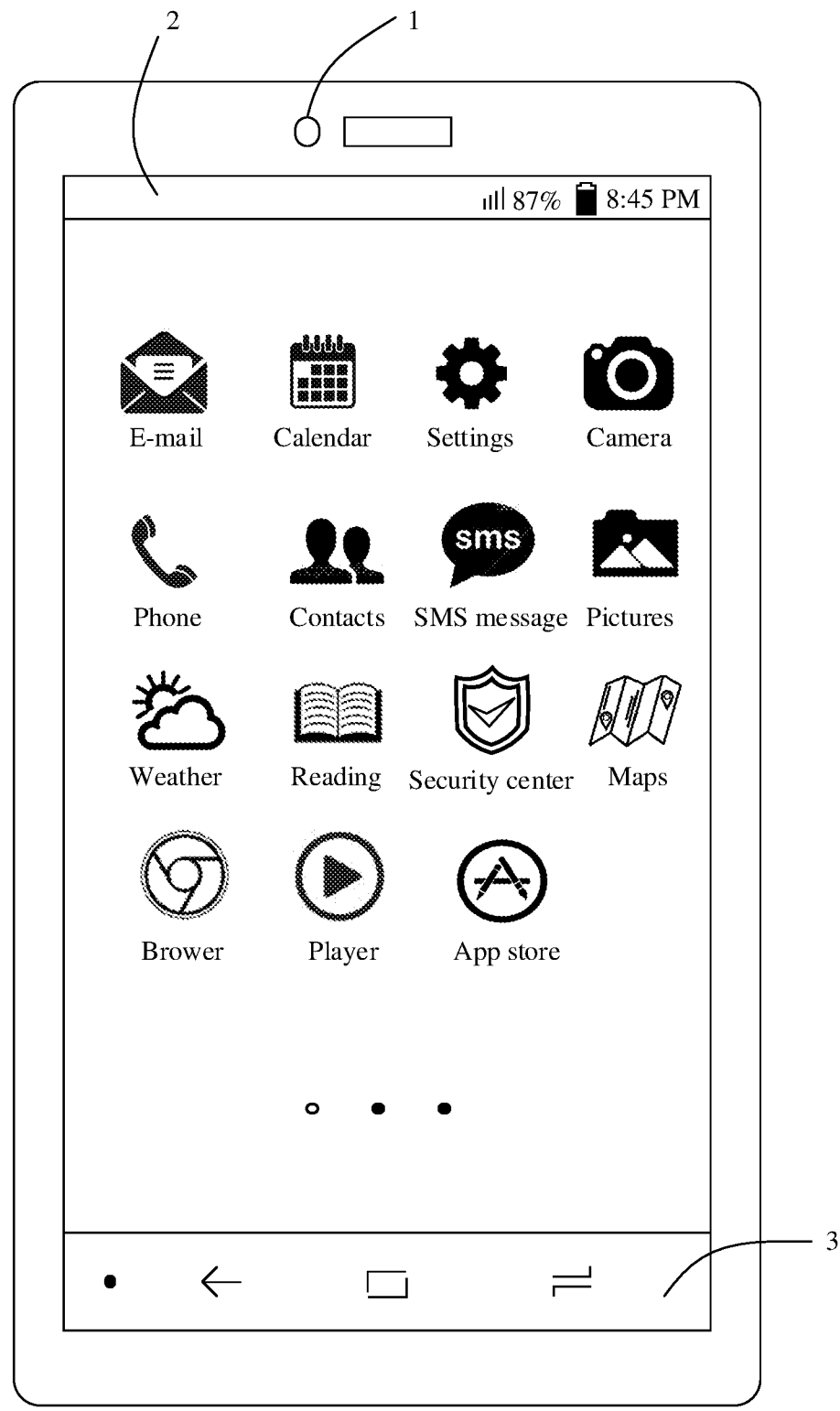
FIG. 27 is a schematic diagram of a home screen of a terminal according to an embodiment of the present invention.

For security, after determining that there is a security risk for the user, the terminal may further present the preset interface on the display screen. The preset interface is a display interface that is set by the user or a display interface that is preset in the terminal, and includes but is not limited to a display interface or an operation interface that requires comparatively low security, such as a picture or a home screen of the terminal. Certainly, the preset interface may alternatively be an interface accessed by the user before the user accesses the current application interface, an interface that is currently running on the background and whose time for switching, by the user, an application corresponding to the interface to the background is comparatively short, or the like. A picture or an animation may also be superimposed on the application interface, the picture or the animation may be moved, or may be deleted. This is not limited herein. FIG. 27 is a schematic diagram of presenting, by a terminal to a user, a home screen of the terminal that is used as a preset interface.

For example, the terminal receives a first operation that is input by the user, where the first operation is used to start a specific application in the terminal. In response to the first operation, the terminal presents a running interface of the application on a display screen, and when the application matches a preset application, automatically turns on a front-facing camera and collects an image by using the front-facing camera. When the image collected by using the front-facing camera meets a preset condition, the display screen presents at least two display windows, a first display window displays the running interface of the application, and a second display window displays the image collected by using the front-facing camera. Then, the terminal may automatically store content presented in the at least two display windows. The content presented in the at least two display windows is selectively sent to the target device. To prompt to pay attention to protecting personal information, a prompt may be further sent out, and/or to directly help a preset user to effectively protect personal information, the preset interface may be further presented on the display screen. The prompt information is used to prompt to pay attention to protecting personal information.

Content displayed on the second display window may alternatively be an enlarged image. In other words, before displaying the enlarged image on the second display window, the terminal may enlarge at least a partial area of the image collected by using the front-facing camera. In this case, a focus window of the front-facing camera is located in an area in which the user other than the preset user is located.

In this embodiment of the present invention, the sending, to a target device, the content presented in the at least two display windows may be specifically implemented as:

receiving a second operation that is input by the user, where the second operation is used to trigger the terminal to transfer, to the target device, the content presented in the at least two display windows. In response to the second operation, the content presented in the at least two display windows is sent to a target device. Alternatively, in this embodiment of the present invention, the terminal may automatically send, to the target device, the content presented in the at least two display windows.

It should be noted that the preset condition includes at least the following: the image collected by using the front-facing camera includes an image of a user other than a preset user, and a distance between the another user and the preset user is less than a specified value; and/or the image collected by using the front-facing camera includes an image of a user other than a preset user, and a distance between the another user and the terminal is less than a specified value; and/or the image collected by using the front-facing camera includes two eyes of a preset user, and further includes at least a third eye; and/or a result of facial recognition performed on the image collected by using the front-facing camera indicates that the image includes a face image other than a preset image.

In addition, the running interface of the application includes but is not limited to the password input interface, and may alternatively be another interface related to preset personal information of the user, and certainly may alternatively be an interface that requires comparatively high security. This is not limited herein.

In this way, if the another user has a peeping behavior, the terminal can simultaneously present an image of the peeping behavior and peeping content of the another user, to resolve a problem that the peeping behavior of the another user cannot be proved.

An embodiment of the present invention provides a display apparatus, applied to a terminal having a front-facing camera and a display screen. The front-facing camera and the display screen are on a same side of the terminal. To implement the foregoing functions, the apparatus includes a corresponding hardware structure and/or software module for implementing each function. A person skilled in the art should be easily aware that, in combination with the examples described in the embodiments disclosed in this specification, units and algorithm steps can be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the apparatus based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in actual implementation.

Figure 28:
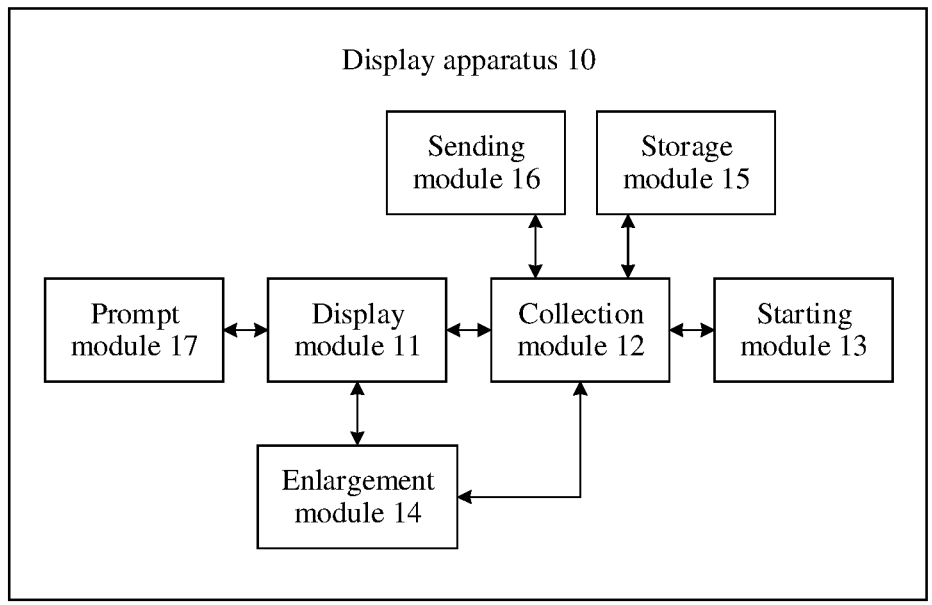
FIG. 28 is a first type of schematic structural diagram of a display apparatus according to an embodiment of the present invention.

FIG. 28 is a possible schematic structural diagram of the display apparatus in the foregoing embodiment. A display apparatus 10 includes: a display module 11, a collection module 12, a starting module 13, an enlargement module 14, a storage module 15, a sending module 16, and a prompt module 17. The display module 11 is configured to support the display apparatus 10 in displaying a running interface of an application and displaying at least two display windows. The collection module 12 is configured to support the display apparatus 10 in collecting an image. The starting module 13 is configured to support the display apparatus 10 in automatically turning on a front-facing camera. The enlargement module 14 is configured to support the display apparatus 10 in enlarging the image. The storage module 15 is configured to support the display apparatus 10 in automatically storing content presented in the at least two display windows, and/or storing required program code and data. The sending module 16 is configured to support the display apparatus 10 in sending, to a target device, the content presented in the at least two display windows, and support data exchange between modules in the display apparatus 10. The prompt module 17 is configured to support the display apparatus 10 in prompting to pay attention to protecting personal information.

The starting module 13 and the enlargement module 14 may be implemented as a processor or a controller, for example, may be the processor 101 in FIG. 1, or may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks, modules, and circuits described with reference to content disclosed in the present invention. The processor may also be a combination implementing a computing function, for example, a combination of one or more microprocessors, or a combination of the DSP and the microprocessor. The sending module 16 may be implemented as a transceiver, a transceiver circuit, a communications interface, or the like. The storage module 15 may be implemented as a memory.

Figure 29:
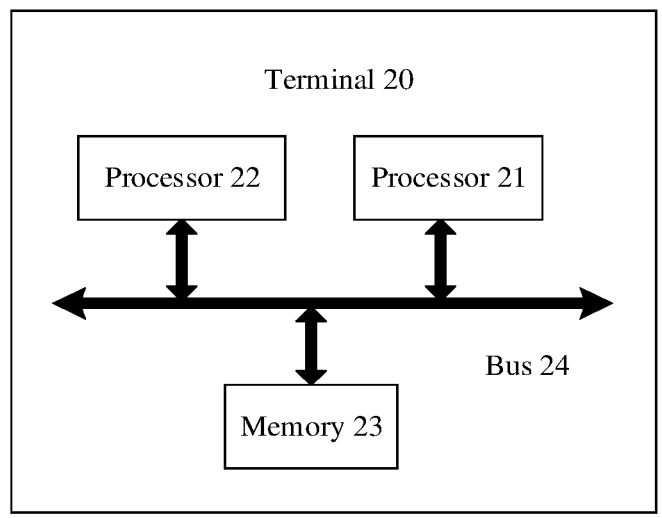
FIG. 29 is a second type of schematic structural diagram of a terminal according to an embodiment of the present invention.

If the starting module 13 and the enlargement module 14 are implemented as a processor, the display module 11, the collection module 12, the sending module 16, and the prompt module 17 are implemented as a transceiver, and the storage module 15 is implemented as a memory, as shown in FIG. 29, the terminal 20 includes a processor 21, a transceiver 22, a memory 23, and a bus 24. The processor 21, the transceiver 22, and the memory 23 are interconnected by using the bus 24. The bus 24 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, the bus 24 is represented by using only one bold line in FIG. 29. However, it does not mean that there is only one bus or only one type of bus.

Figure 30:
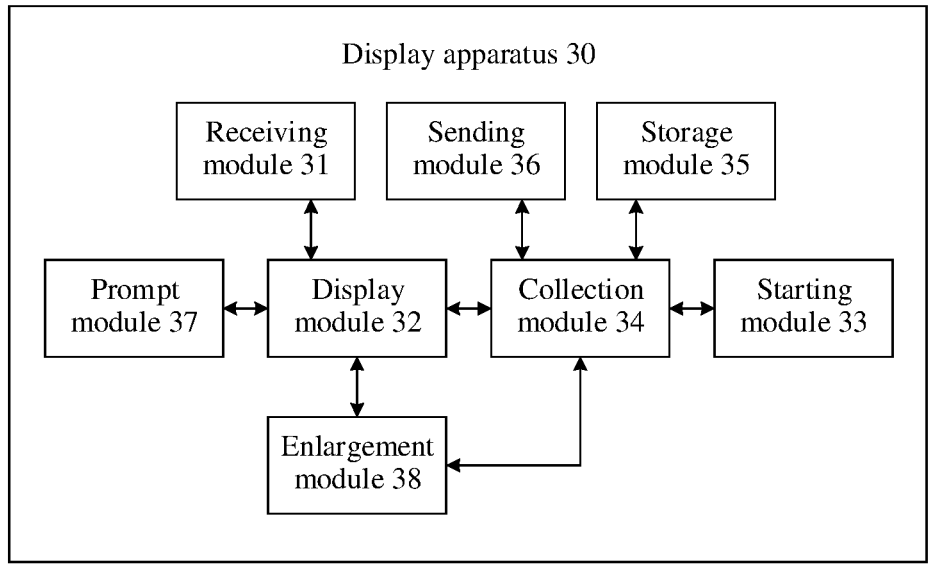
FIG. 30 is a second type of schematic structural diagram of a display apparatus according to an embodiment of the present invention.

FIG. 30 is a possible schematic structural diagram of the display apparatus in the foregoing embodiment. A display apparatus 30 includes: a receiving module 31, a display module 32, a starting module 33, a collection module 34, a storage module 35, a sending module 36, a prompt module 37, and an enlargement module 38. The receiving module 31 is configured to support the display apparatus 30 in receiving a first operation and a second operation of a user. The display module 32 is configured to support the display apparatus 30 in displaying a running interface of an application and displaying at least two display windows. The starting module 33 is configured to support the display apparatus 30 in automatically turning on a front-facing camera. The collection module 34 is configured to support the display apparatus 30 in collecting an image. The storage module 35 is configured to support the display apparatus 30 in automatically storing content presented in the at least two display windows, and/or storing required program code and data. The sending module 36 is configured to support the display apparatus 30 in sending, to a target device, the content presented in the at least two display windows, and support data exchange between modules in the display apparatus 30. The prompt module 37 is configured to support the display apparatus 30 in prompting to pay attention to protecting personal information. The enlargement module 38 is configured to support the display apparatus 30 in enlarging the image.

The starting module 33 and the enlargement module 38 may be implemented as a processor or a controller, for example, may be the processor 101 in FIG. 1, and may be a CPU, a general purpose processor, a DSP, an application-specific integrated circuit ASIC, an FPGA or another programmable logic device, a transistor logic device, a hardware component, or any combination thereof. The processor may implement or execute various example logical blocks, modules, and circuits described with reference to content disclosed in the present invention. The processor may also be a combination implementing a computing function, for example, a combination of one or more microprocessors, or a combination of the DSP and the microprocessor. The receiving module 31 and the sending module 36 may be implemented as a transceiver, a transceiver circuit, a communications interface, or the like. The storage module 35 may be implemented as a memory.

Figure 31:
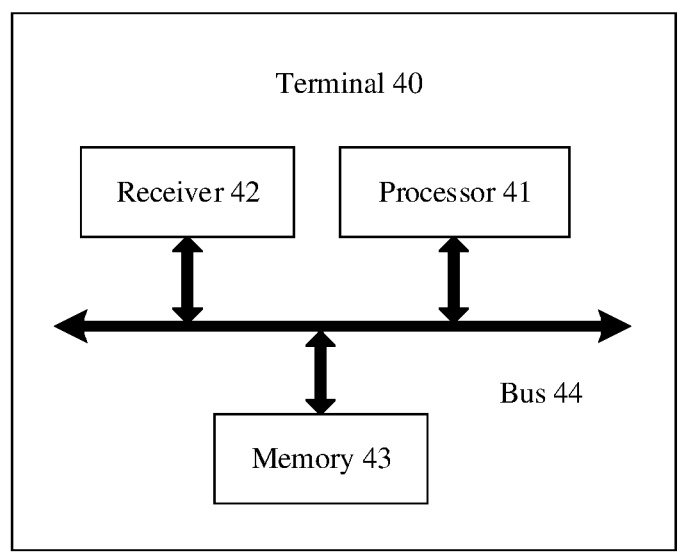
FIG. 31 is a third type of schematic structural diagram of a terminal according to an embodiment of the present invention.

If the starting module 33 and the enlargement module 38 are implemented as a processor, the receiving module 31, the display module 32, the collection module 34, the sending module 36, and the prompt module 37 are implemented as a transceiver, and the storage module 35 is implemented as a memory, as shown in FIG. 31, the terminal 40 includes a processor 41, a transceiver 42, a memory 43, and a bus 44. The processor 41, the transceiver 42, and the memory 43 are interconnected by using the bus 44. The bus 44 may be a PCI bus, an EISA bus, or the like. The bus may be classified into an address bus, a data bus, a control bus, and the like. For ease of representation, the bus 44 is represented by using only one bold line in FIG. 31. However, it does not mean that there is only one bus or only one type of bus.

An embodiment of the present invention provides a computer program product, the computer program product includes software code, and the software code is used to perform the foregoing method procedure.

An embodiment of the present invention provides a readable storage medium, including an instruction. When the instruction is run on a terminal, the terminal is enabled to perform the foregoing method procedure.

A person skilled in the art should be aware that in the foregoing one or more examples, functions described in the embodiments of the present invention may be implemented by hardware, software, firmware, or any combination thereof. When the functions are implemented by software, the functions may be stored in a computer readable medium or transmitted as one or more instructions or code in a computer readable medium. The computer readable medium includes a computer storage medium and a communications medium. The communications medium includes any medium that enables a computer program to be transmitted from one place to another. The storage medium may be any available medium accessible to a general-purpose or special-purpose computer.

The objectives, technical solutions, and beneficial effects of the embodiments of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the embodiments of the present invention shall fall within the protection scope of the embodiments of the present invention.

What is claimed is:

1. A method, comprising:
   presenting, by a terminal, a first interface by using a display screen; and
   obtaining, by the terminal, an image through a front-facing camera when the terminal is in an unlocked state, wherein the terminal comprises the front-facing camera and the display screen, and the front-facing camera and the display screen are on a same side of the terminal;
   capturing, by the terminal, the image in response to detecting that the image comprises a preset user and a user other than the preset user and further in response to a distance between the user and the preset user being less than a specified value, wherein the detecting the distance between the user and the preset user comprises identifying a brightness change of the face of the preset user and the face of the user by increasing or decreasing display brightness of the display screen, and further comprises determining the distance between the user and the preset user according to the brightness change; and
   presenting, by the terminal, a second interface without presenting the first interface, wherein the second interface is presented using the display screen and is further presented in response to the image obtained by the front-facing camera comprising the preset user and at least one other user other than the preset user, wherein determining that the image comprises the preset user and the at least one other user comprises detecting two eyes of the preset user and further comprises detecting at least a third eye that is an eye of a user other than the preset user;

wherein the first interface comprises privacy information, and the second interface omits inclusion of privacy information.

2. The method of claim 1, wherein the method further comprises:
automatically presenting the image comprising the user other than the preset user.

3. The method of claim 1, wherein obtaining, by the terminal, the image through the front-facing camera when the terminal is in the unlocked state, comprises:
automatically obtaining, by the terminal, the image through the front-facing camera when the terminal displays an interaction interface of a preset application.

4. The method of claim 1, wherein the method further comprises:
providing prompt information, wherein the prompt information prompts a user to pay attention to protecting personal information.

5. The method of claim 1, wherein the method further comprises:
presenting a preset interface on the display screen in response to detecting the image comprises the user other than the preset user.

6. The method of claim 1, wherein a focus window of the front-facing camera is focused on the user other than the preset user.

7. The method of claim 1, wherein the method further comprises:
sending, by the terminal, to a target device, the image comprising the user other than the preset user;
wherein the target device comprises a server or a device other than the terminal.

8. The method of claim 1, further comprising:
obtaining a distance between the preset user and the at least one other user;
wherein the presenting the second interface without presenting the first interface comprises presenting, by the terminal, the second interface without presenting the first interface, wherein the second interface is presented using the display screen in response to the distance between the preset user and the at least one other user being less than a predetermined value.

9. A terminal, comprising:
a front-facing camera;
a display screen;
a processor; and
a non-transitory computer-readable medium having processor-executable instructions stored thereon, wherein the processor-executable instructions, when executed by the processor, cause the terminal to:
present a first interface by using the display screen;
obtain an image through the front-facing camera when the terminal is in an unlocked state;
capture the image in response to detecting that the image comprises at least one user other than a preset user and further in response to a distance between the user and the preset user being less than a specified value, wherein the detecting the distance between the user and the preset user comprises identifying a brightness change of the face of the preset user and the face of the user by increasing or decreasing display brightness of the display screen, and further comprises determining the distance between the user and the preset user according to the brightness change; and
present a second interface without presenting the first interface, wherein the second interface is presented using the display screen and is further presented in response to the image obtained by the front-facing camera comprising the preset user and the at least one user other than the preset user, wherein determining that the image comprises the preset user and the at least one other user comprises detecting two eyes of the preset user and further comprises detecting at least a third eye that is an eye of a user other than the preset user;

wherein the first interface comprises privacy information, and the second interface does not comprise privacy information.

10. The terminal of claim 9, wherein the processor-executable instructions, when executed by the processor, further cause the terminal to:
automatically present the image comprising the user other than the preset user.

11. The terminal of claim 9, wherein the processor-executable instructions to obtain the image through the front-facing camera when the terminal is in the unlocked state, comprises further instructions to:
automatically obtain the image through the front-facing camera when the terminal displays an interaction interface of a preset application.

12. The terminal of claim 9, wherein the processor-executable instructions, when executed by the processor, further cause the terminal to:
provide prompt information, wherein the prompt information prompts a user to pay attention to protecting personal information.

13. The terminal of claim 9, wherein the processor-executable instructions, when executed by the processor, further cause the terminal to:
present a preset interface on the display screen in response to detecting the image comprises the user other than a preset user.

14. The terminal of claim 9, wherein the processor-executable instructions, when executed by the processor, further cause the terminal to:
send, to a target device, the image comprising the user other than the preset user;
wherein the target device comprises a server or a device other than the terminal.

15. The terminal of claim 9, wherein the processor-executable instructions that further cause the terminal to:
obtaining a distance between the preset user and the at least one other user; and
wherein the processor-executable instructions that cause the terminal to present the second interface without presenting the first interface cause the terminal to present the second interface without presenting the first interface, wherein the second interface is presented using the display screen in response to the distance between the preset user and the at least one other user is less than a predetermined value.

16. A non-transitory computer-readable medium having processor-executable instructions stored thereon, wherein the processor-executable instructions, when executed, cause a terminal to:

presenting a first interface by using a display screen;

obtain an image through a front-facing camera of the terminal when the terminal is in an unlocked state;

capture the image in response to detecting the image comprises a user other than a preset user and further in response to a distance between the user and the preset user being less than a specified value, wherein the detecting the distance between the user and the preset user comprises identifying a brightness change of the face of the preset user and the face of the user by increasing or decreasing display brightness of the display screen, and further comprises determining the distance between the user and the preset user according to the brightness change; and present, by the terminal, a second interface without presenting the first interface, wherein the second interface is presented using the display screen and is further presented in response to the image obtained by the front-facing camera comprising the preset user and at least one other user other than the preset user, wherein determining that the image comprises the preset user and the at least one other user comprises detecting two eyes of the preset user and further comprises detecting at least a third eye that is an eye of a user other than the preset user;

wherein the first interface comprises privacy information, and the second interface does not comprise privacy information.

17. The non-transitory computer-readable medium of claim 16, wherein the processor-executable instructions, when executed, further cause the terminal to:

automatically present the image comprising the user other than the preset user.

18. The non-transitory computer-readable medium of claim 16, wherein the processor-executable instructions to obtain, by the terminal, the image through the front-facing camera when the terminal is in an unlocked state, comprises further instructions to:

automatically obtain the image through the front-facing camera when the terminal displays an interaction interface of a preset application.

19. The non-transitory computer-readable medium of claim 16, wherein the processor-executable instructions, when executed, further cause the terminal to:

provide prompt information, wherein the prompt information prompts a user to pay attention to protecting personal information.

20. The non-transitory computer-readable medium of claim 16, wherein the processor-executable instructions, when executed, further cause the terminal to:

present a preset interface on a display screen of the terminal in response to detecting the image comprises the user other than the preset user.

* * * * *